United States Patent [19]
Nielsen

[11] Patent Number: 5,870,548
[45] Date of Patent: Feb. 9, 1999

[54] METHOD AND APPARATUS FOR ALTERING SENT ELECTRONIC MAIL MESSAGES

[75] Inventor: Jakob Nielsen, Atherton, Calif.

[73] Assignee: Sun Microsystems, Inc., Palo Alto, Calif.

[21] Appl. No.: 628,440

[22] Filed: Apr. 5, 1996

[51] Int. Cl.⁶ .................................................. G06F 15/16
[52] U.S. Cl. .............................. 395/200.36; 395/200.46; 395/200.67; 379/93.24
[58] Field of Search .................. 395/200.31, 200.46, 395/200.55, 200.62, 200.76, 200.36, 200.67; 707/205, 206, 10, 530, 540, 542; 370/463, 472; 377/57, 88, 58, 63; 379/93.01, 93.24, 100.08

[56] References Cited

U.S. PATENT DOCUMENTS 4,503,499   3/1985   Mason et al. ............................ 395/553

OTHER PUBLICATIONS

Bishop, M., "An Authentication Mechanism for USENET," USENIX Association. *Proceedings of the Winter 1991 USENIX Conference.* 281–287 (1991).

European Search Report for EP Application No. EP 97 30 2359 dated Jun. 8, 1998.

Galvin, J.M. and Feldman, M.S., "Mime Object Security Services: Issues in a Multi–User Environment," *5th UNIX Security Symposium.* 217–223 (1995).

Jaeger, T. and Prakash, A., "Support for the File System Security Requirements of Computatioinal E–Mail Systems," *2nd ACM Conference on Computer and Commuications Security.* 1–9 (1994).

Price, W.L., "Encryption in Computer Networks and Message Systems," *Computer Message Systems. Proceedings of the IFIP TC–6 International Symposium on Computer Message Systems.* 413–423 (1981).

Raeder, Aggi, "Beyond Netiguette", Jan. 1995, IAC Trade & Industry Data Base.

Article entitled "Standard for Interchange of USENET Messages", by Mark R. Horton, Jun. 1983, RFC 850, URL:ftp://nic.merit.edu/documents/rfc/rfc0850.txt. (pp. 1–18).

Article entitled "Standard for the Format of ARPA Internet Text Messages", revised by David H. Crocker, Aug. 13, 1982, Dept. of Engineering, University of Delaware (RFC #No. 882) PP. i–47.

*Primary Examiner*—Larry D. Donaghue
*Assistant Examiner*—Paul R. Myers
*Attorney, Agent, or Firm*—Daniel B. Curtis

[57] ABSTRACT

Apparatus methods, systems and computer program products are disclosed to provide electronic mail systems with the capability to act on previously-sent messages that have passed beyond the scope of control of the sending e-mail system.

49 Claims, 21 Drawing Sheets

Message DB Data Record

Cancel DB Data Record

Modified DB Data Record

METHOD AND APPARATUS FOR ALTERING SENT ELECTRONIC MAIL MESSAGES

BACKGROUND OF THE INVENTION

FIELD OF THE INVENTION

This invention relates to the field of Electronic Mail Management Systems. Specifically, this invention is a new and useful method, apparatus, system and computer program product for allowing the sender of an electronic mail message to delete or modify the message after it has been sent.

BACKGROUND

Electronic mail (e-mail) provides a quick and convenient way for computer users to communicate. This communication is initiated by a message sender composing a message using text (and optionally including other data) and addressing the message to a recipient at the same or different computer.

To use e-mail, the message sender composes the message using a text editing program, provides the e-mail address of the intended recipient, and often provides an indication of the content (subject matter) of the message by providing text in a "subject" field. Using well-understood technology this composed message is then sent to the recipient's computer address. The recipient's computer receives the message and stores it in the recipient's inbox. The recipient eventually reads, deletes, responds to, or otherwise processes the message stored within the inbox by using any of a number of e-mail programs well known in the art. Often messages are sent from one computer to another across the Internet.

One characteristic of the Internet is that once a message is submitted to the Internet, the Internet has the responsibility to deliver the message and the message becomes an independent entity—no longer under the scope of control of the program that submitted the message. Once the message is submitted to the Internet, it cannot be directly altered, canceled, or retracted by the originating program.

Some e-mail systems provide a central repository for e-mail. Using this type of e-mail system the message sender composes the message and sends the message to the recipient. The e-mail system saves the message in the e-mail repository until the recipient retrieves the message. In such a system, the sender can stop delivery of the message if the recipient has not yet retrieved the message because the message remains within the scope of control of the originating e-mail system. This prior art situation is shown in FIG. 1A. Here a number of computer systems 161, 163, 165, 167, 169 are attached to a network 171. The e-mail server computer 169 is attached to a filestorage device 173. This system, as so far described, is illustrative of a central mail repository system. Additionally, it is useful to allow a centralized mail repository system to send and receive messages over the Internet. In the case illustrated in FIG. 1A, the computer serving as an Internet gateway 167 provides access to the Internet 175 for the computers 161, 163, 165, 169 that are connected to the network labeled as 171. Messages that enter the Internet 175 leave the scope of control of the sending e-mail system. Thus, messages that flow to the Internet by way of gateway 167 are outside the scope of control of all the computers 161, 163, 165, 167, 169. Thus, messages sent to a computer 177 on the Internet 175 from a computer 161, 163, 165, 167, 169 serviced by the central e-mail system 169 are no longer under the control of the e-mail system resident on the e-mail server computer 169. Thus, for example, a user on the computer labeled as 161 who sends a message to a user of the computer labeled as 177 does not have the capability to cancel or modify a previously-sent message. In addition, the user on the computer labeled as 177 is unable to cancel or modify a message addressed to a user on the computer labeled as 165, In both cases the reason the user is unable to affect the message is because the message has passed beyond the scope of control of the user's mail system, has taken on a life of its own and is not under the control of any program but is an entity traversing the Internet until it arrives at its destination.

Another messaging schema is the Usenet Network News facility (netnews) that is well know to the art. Netnews has a "cancel" feature that allows the author of a message to send a follow-up cancel message that causes the recipient computers to remove the original message from their news directory. This netnews feature relies on the standardized nature of netnews—all recipient computers are programmed to process cancel messages. However, netnews messages cannot be modified they can only be canceled. Further, netnews does not address the problem where some recipients have already read the message before it was canceled. Finally, the netnews cancel facility allows someone other than the originator of the message to cancel messages they disagree with because there is no security process to validate who the originator of the previously-sent message.

Because these messages travel across networks, they generally are constructed according to the Standard for the Format of ARPA Internet Text Messages specification (RFC822). This specification can be found on the world wide web of the Internet at address "http://www.cis.ohio-state.edu/htbin/rfc/rfc822.html" and is included by reference. Messages formatted to the RFC822 standard have a header portion and an optional body portion that contains the text of the message. The header portion includes a number of fields that address and classify the message. The invention does not require that the RFC822 standard be followed. So long as there is a way to identify essential information the invention will operate. This essential information comprises a list of the message recipients, a subject field for a message and a unique message identifier. The embodiment described herein uses the RFC822 protocol.

The header portion of a message contains fields composed of character strings comprising a field-name followed by a colon, followed by a field-body terminated by a carriage return/line feed. An example RFC822 header field is:

"To: John Doe<CR><LF>".

In this example, the <CR> represents the ASCII carriage return character and the <LF> represents the ASCII line feed character. The header field-names are not case sensitive, thus, "to: " is equivalent to "TO: ", "To: " or "tO:".

The Invention uses the information contained in the: "Subject:", "To:", "Cc:", "Bcc:", "Date:", and "Message-ID:" fields of a previously-sent message stored in the sending e-mail system. The contents of these fields are specified in RFC822.

As mentioned above, the problem with prior art e-mail systems is that once a message passes beyond the scope of control of the originating e-mail system, it cannot be canceled or modified. Human nature being what it is, there have been many instances where the sender of a message would have liked to cancel that message without the intended recipient having seen the message. Examples of these mistakes extend from noticing a misspelling just after sending the message to an over enthusiastic response to perceived criticism.

The invention addresses these problems and simplifies a recipient's use of e-mail by providing a mechanism for canceling or modifying a previously-sent e-mail message that has passed beyond the scope of control of the sender's e-mail system.

SUMMARY OF THE INVENTION

The present invention overcomes the disadvantages of the above described systems and provides an economical, apparatus, method, system and computer program product for providing enhanced facilities to users of electronic mail. One aspect of the invention is a computer controlled method for allowing an e-mail sender to alter a previously-sent electronic mail message addressed to a recipient whose computer is beyond the scope of control of the sender's computer. The sender first selects which previously-sent message to alter. The invention then constructs an action message and sends the action message to the recipient's computer where it is received.

In another aspect of the invention, an electronic mail system is disclosed providing a selection mechanism to allow a message sender to select a previously-sent message. Once a message is selected, a fabrication mechanism constructs an action message relating to the selected previously-sent message. A delivery mechanism then sends the action message to the same e-mail system as the selected previously-sent message where the action message is received by a reception mechanism.

In yet another aspect of the invention an apparatus for sending action messages is disclosed. This apparatus includes a selection mechanism, a fabrication mechanism and a delivery mechanism cooperating to select a previously-sent e-mail message, construct an action message for that previously-sent e-mail message and send the action message to a destination.

Another aspect of the invention is a computer program product on a computer usable medium for causing a computer to provide action messages to modify a previously-sent message.

One aspect of the invention is an apparatus for receiving and processing action messages. This aspect includes a first reception mechanism to receive an action message. It also includes a second reception mechanism to receive previously-sent messages. Finally, it includes an adjustment mechanism that applies the action message to the previously-sent message.

Yet a final aspect of the invention is a computer program product on a computer usable medium for causing a computer to receive an action message and a previously-sent message and apply the action message to the previously-sent message.

DESCRIPTION OF THE DRAWINGS

The objects, features and advantages of the system of the present invention will be apparent from the following description in which.

NOTATIONS AND NOMENCLATURE

Figure 1A:
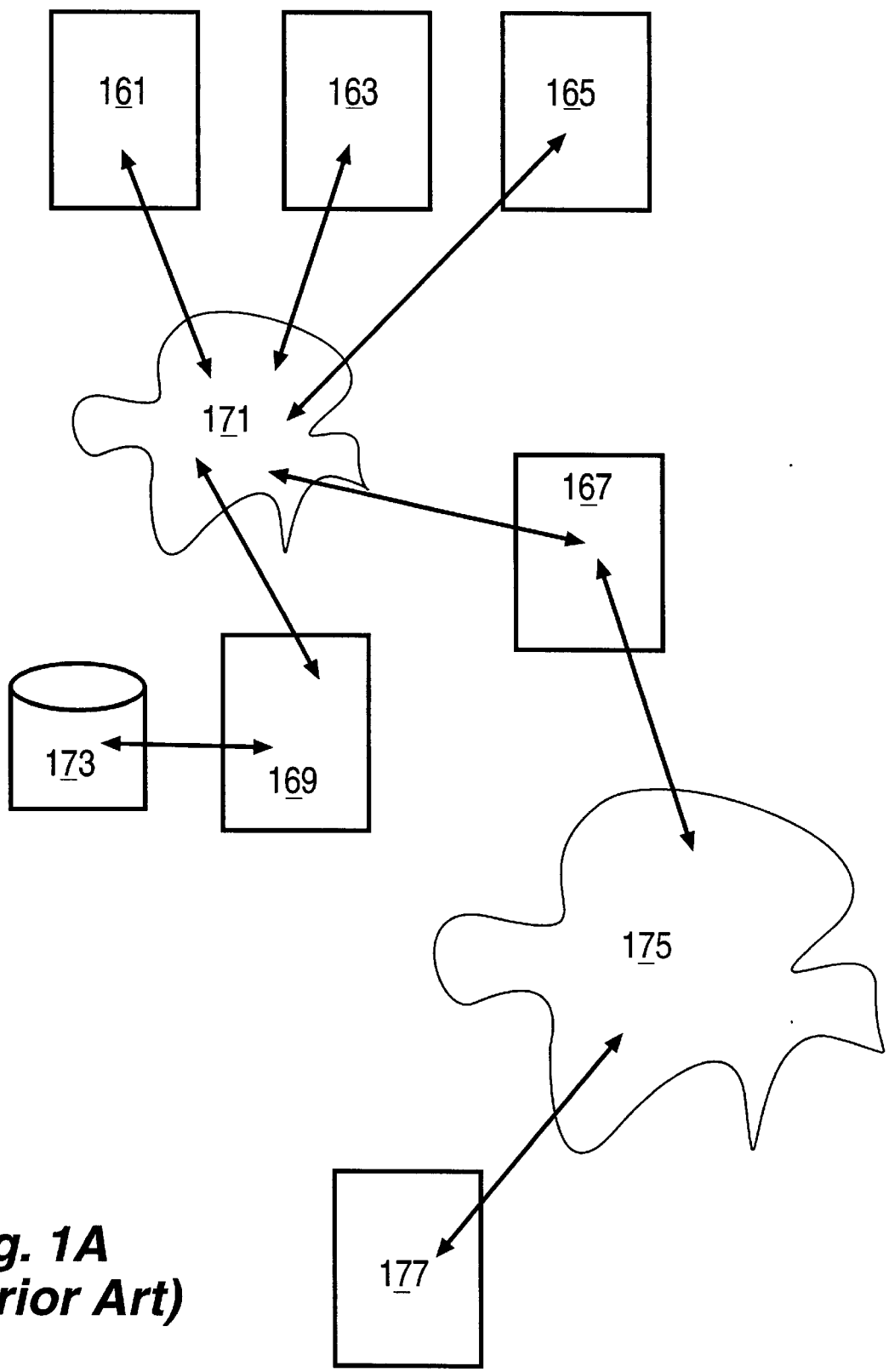
FIG. 1A illustrates the basic prior art concepts of an electronic mail communication.

Cancel message—An e-mail message that is constructed to cause the recipient's e-mail system to delete a previously-sent message that the recipient has not seen, or notify the recipient of the sender's desire to cancel the previously-sent message that the recipient has seen.

E-mail system—Electronic mail system. A system of computers generally connected by a network that allow a sender (being a user of a first computer) to compose and send data making up a message to a recipient (being a user of either the first computer or of a second computer).

Graphical User Interface (GUI)—A user interface that allows a user to interact with a computer display by pointing at selectable control areas on the display and activating a command or computer operation associated with the selectable control area. GUIs are well known in the art.

Modify message—An e-mail message that is constructed to cause the recipient's e-mail system to modify a previously-sent message that the recipient has not seen, or notify the recipient of the sender's desire to modify the previously-sent message that the recipient has seen.

Original message—An e-mail message that the sender composed and sent to a recipient. For this disclosure, once the original message leaves the scope of control of the sender's e-mail system the message is termed the previously-sent message. For the purposes of this application, the original message is the message that the sender desires to cancel or modify.

Pointing device—A device that is responsive to a computer user's input that moves an indicator on a computer display screen. Such an indicator has an active point such that if the pointing device is activated (e.g., by a button push for a mouse device) a command associated with the selectable control area covered by the active point is evoked. Pointing devices are generally used with graphical user interfaces.

Previously-sent message—An original message that is beyond the scope of control of the sender's e-mail system. Cancel and Modify messages operate on the Previously-sent message.

Scope of control—A characteristic of an e-mail system. While a message is within the scope of control of an e-mail system, that e-mail system can delete or otherwise affect the message. Once the message leaves the sending e-mail system's scope of control, the sending system can no longer directly affect the message.

Selectable control area—An area on a computer display that is sensitive to activation of a pointing device. On activation of the pointing device over the selectable control area, a command or computer operation associated with the selectable control area is evoked. Most computer systems that provide a Graphical User Interface (GUI) also provide other methods for evoking these commands or computer operations such as keyboard function keys or command lines.

A procedure is a self-consistent sequence of steps leading to a desired result. These steps are those requiring physical manipulation of physical quantities. Usually these quantities take the form of electrical or magnetic signals capable of being stored, transferred, combined, compared, and otherwise manipulated. These signals are referred to as bits, values, elements, symbols characters, terms, numbers, or the like. It will be understood by those skilled in the art that all of these and similar terms are associated with the appropriate physical quantities and are merely convenient labels applied to these quantities.

The manipulations performed by a computer in executing opcodes are often referred to in terms, such as adding or comparing, that are commonly associated with mental operations performed by a human operator. No such capability of a human operator is necessary in any of the operations described herein that form part of the present invention;

the operations are machine operations. Useful machines for performing the operations of the invention include programmed general purpose digital computers or similar devices. In all cases the method of computation is distinguished from the method of operation in operating a computer. The present invention relates to method steps for operating a computer in processing electrical or other (e.g., mechanical, chemical) physical signals to generate other desired physical signals.

The invention also relates to apparatus for performing these operations. This apparatus may be specially constructed for the required purposes or it may comprise a general purpose computer as selectively activated or reconfigured by a computer program stored in the memory of a computer. The procedures presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the description below.

Finally, the invention may be embodied in a computer readable medium encoded with an electronic mail program.

DESCRIPTION OF THE PREFERRED EMBODIMENTS

Operating Environment

Figure 1B:
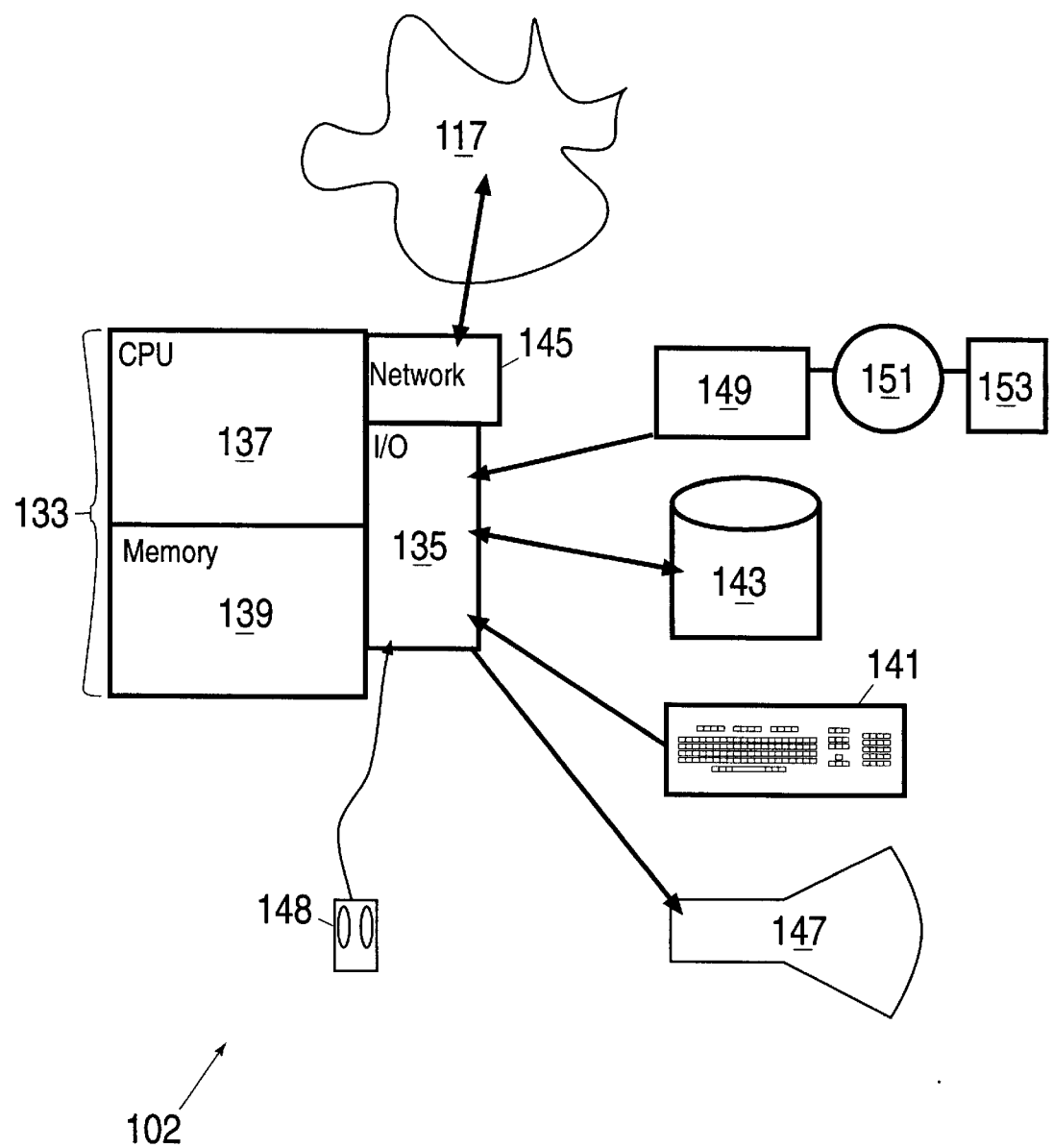
FIG. 1B illustrates a typical computer system that supports an e-mail system.

Some of the elements of a computer system 102 configured to support an e-mail application is shown in FIG. 1B wherein a processor 133 is shown, having an Input/Output ("I/O") section 135, a central processing unit ("CPU") 137 and a memory section 139. The I/O section 135 is connected to a keyboard 141, a disk storage unit 143, a network interface 145 to provide access to a network 117, a display unit 147, a pointing device 148 and a CD-ROM drive unit 149. The CD-ROM unit 149 can read a CD-ROM medium 151 that typically contains programs 153 and data. The CD-ROM 149 and the disk storage unit 143 comprising a filestorage mechanism. Such a computer system is capable of executing e-mail applications that embody the invention.

Figure 2:
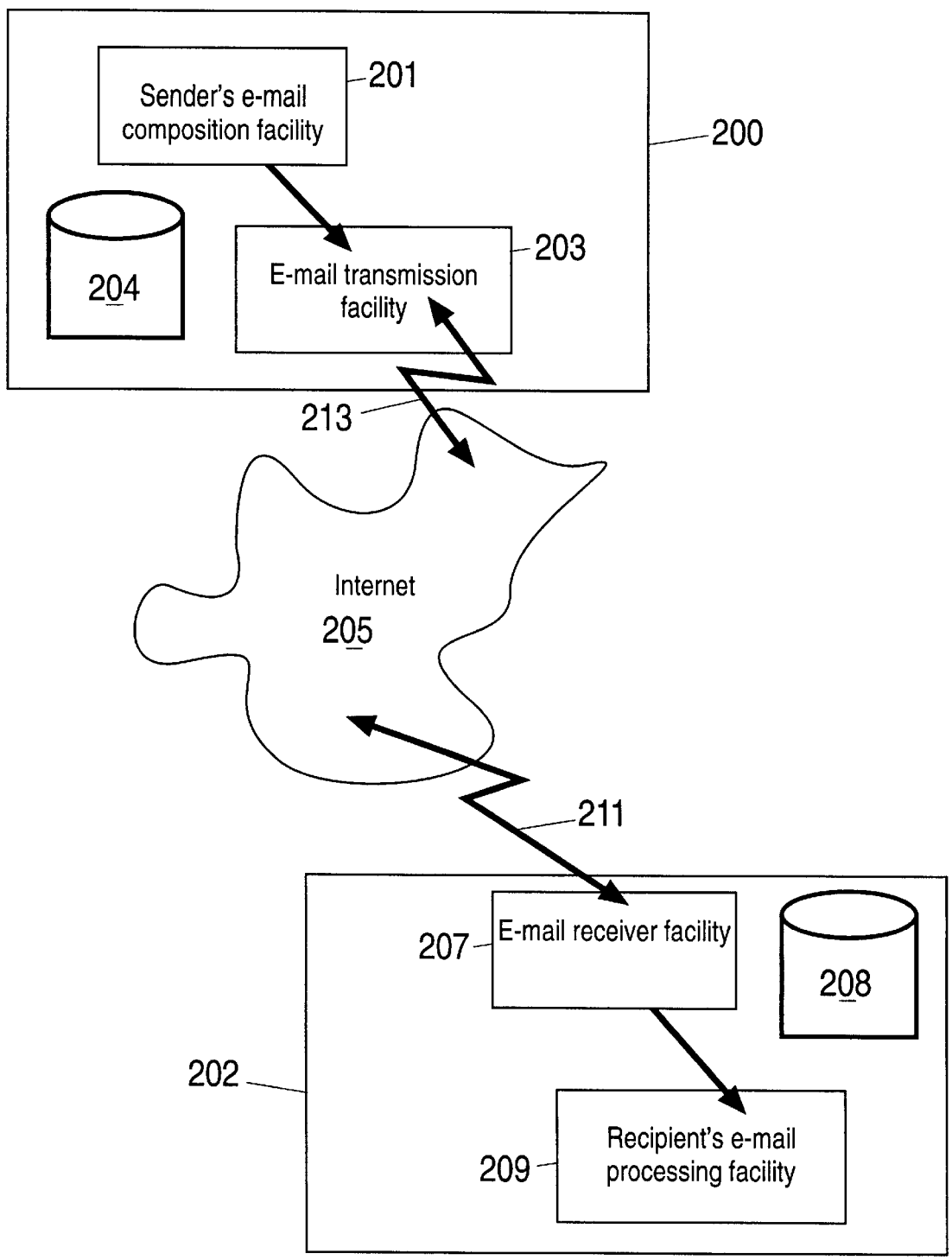
FIG. 2 illustrates a basic prior art system components required for an originating e-mail system to send a message to a recipient e-mail system via a network (the Internet)

FIG. 2 illustrates how a plurality of computers, encompassing the configuration described in FIG. 1B, implement e-mail processing in the Internet environment. A sender creates a message using an e-mail composition facility 201 on the sender's computer 200. Once the e-mail message is created, it passes to an e-mail transmission facility 203. A copy of the e-mail is saved in the sender's outbox 204 in the sending e-mail system 200. The e-mail transmission facility 203 encapsulates the e-mail within an Internet protocol and passes the encapsulated e-mail to the Internet 205, as indicated by the arrow labeled as 213, where the message passes beyond the scope of control of the sender's e-mail system 200. The Internet 205 routes the e-mail to the recipient's computer 202, as indicated by the arrow labeled as 211, where the message is received by the e-mail receiver facility 207. The e-mail receiver facility 207 stores the message in the recipient's inbox 208. The recipient uses an e-mail processing facility 209 to read, respond to, delete or otherwise dispose of the e-mail message. One important characteristic of this configuration is that the sending e-mail system 200 relinquishes control over the message (the message leaves the scope of the sender's e-mail system) once it enters the Internet 205. Thus, once the message is beyond the scope of control of the sender's e-mail system, the message cannot be deleted or modified. This characteristic of the prior art is the root cause of the problem leading to the invention.

Figure 3:
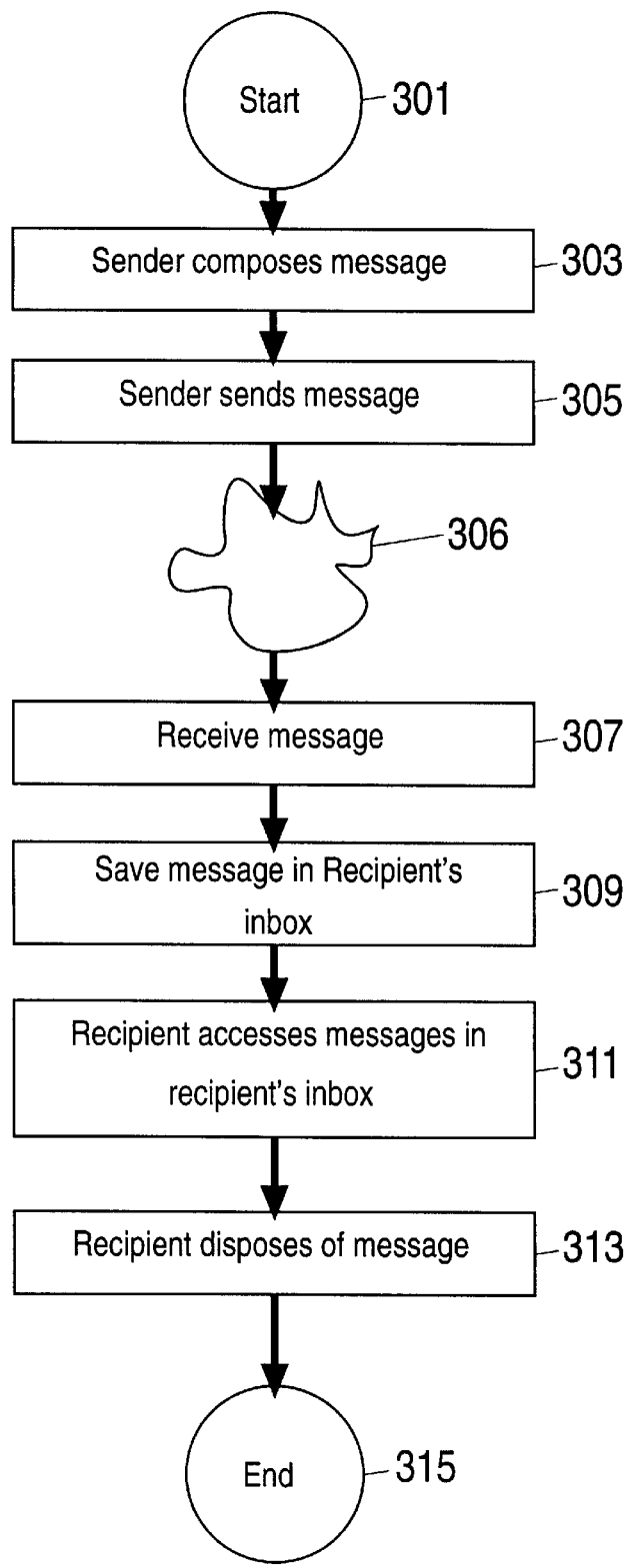
FIG. 3 illustrates the prior art process for sending an e-mail message across a network.

FIG. 3 illustrates the process of sending and receiving messages used in the prior art. The process starts at the terminal labeled as 301. First, the sender composes a message 303 and when satisfied with the content, sends the message 305 to a destination. A copy of the message, including header information is stored in the sender's outbox. The message is submitted to a network 306 beyond the scope of control of the sender's e-mail system and is eventually received 307 at its destination by the recipient's computer. In the prior art, at the time the message leaves the scope of control of the sender's e-mail system the message can no longer be deleted or modified. The recipient's computer saves the message in the recipient's inbox 309. The recipient accesses the message stored in the inbox 311 and disposes of the message 313 as desired and the process completes through the terminal labeled as 315.

As an additional complication, the Internet may attempt to route these messages over multiple paths. Some of these paths are faster than others. Hence, it is possible for a previously-sent, cancel or modify message to arrive at the recipients computer in a different sequence than they were sent. Further, multiple copies of these messages may arrive at the recipient's computer. As described below, these Internet issues are addressed by the a invention.

Altering a Previously-sent Message

Figure 4:
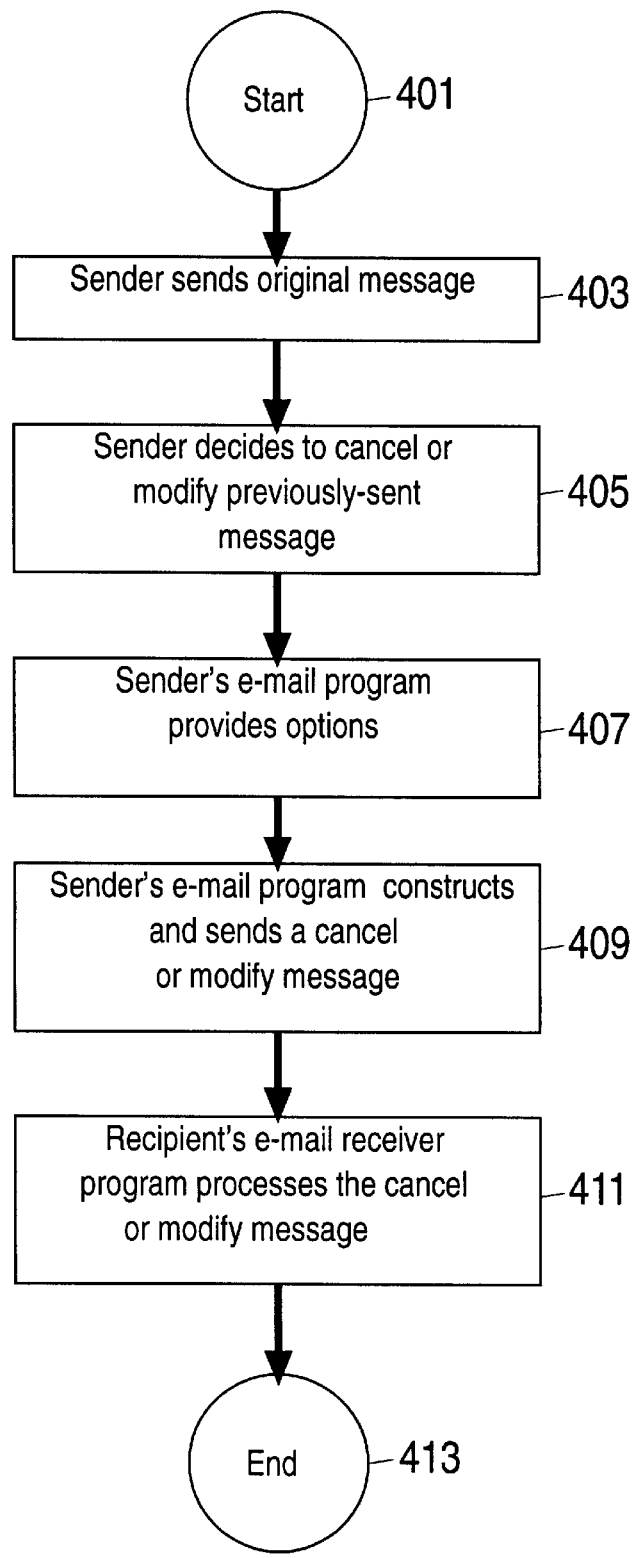
FIG. 4 illustrates the process of modifying or canceling a previously-sent message in accordance with a preferred embodiment.

FIG. 4 illustrates the innovative process used by the invention to alter (modify or cancel) a previously-sent message that has passed beyond the scope of control of the originating e-mail system. The process starts at the terminal labeled 401. As in the process illustrated by FIG. 3, the sender sends an original message 403. After the message has left the scope of control of the sending e-mail system, the sender decides 405 to modify or cancel the previously-sent message (the original message created in step 403). The sender's e-mail program provides the sender 407 with options for the disposition of the previously-sent message. Dependent on the sender's selections, the sender's e-mail program constructs an action message (a cancel or modify message) 409 targeted toward the previously-sent message, and sends this constructed action message to the same recipients as the previously-sent message. The recipient's e-mail system processes the action message 411 and the process completes through the terminal block labeled as 413.

Figure 5:
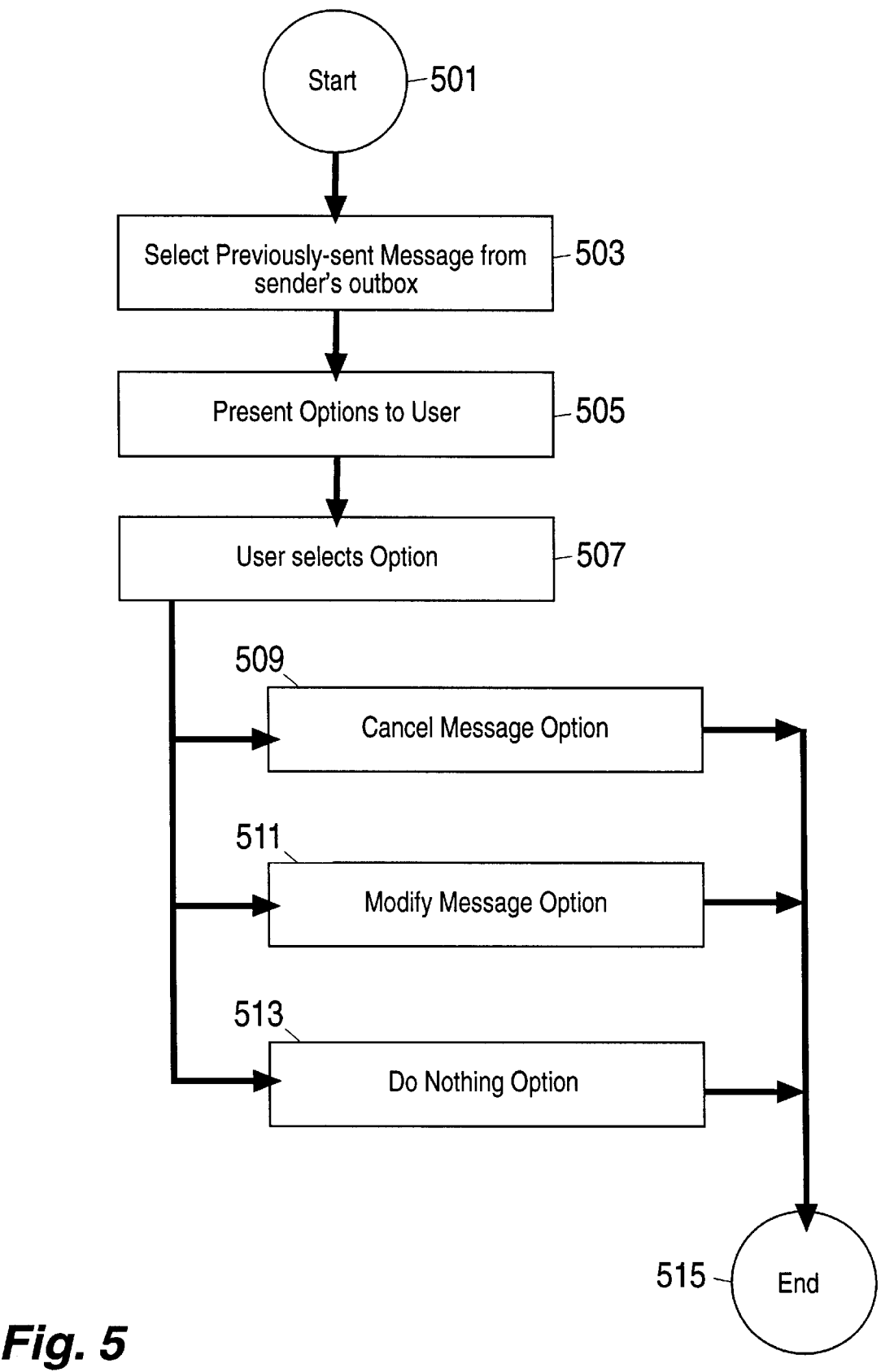
FIG. 5 illustrates the process for selecting and operating on a previously-sent message in accordance with a preferred embodiment.

FIG. 5 illustrates the sender's process to alter a previously-sent message. The process starts at the terminal labeled as 501. The sender's e-mail program provides a mechanism (usually a database that consists of copies of messages that have been sent) that allows the sender to select a previously-sent message 503. The sender's e-mail program then provides the sender with the means to specify whether the selected previously-sent message is to be canceled, modified, or to leave the previously-sent message unchanged 505. The sender specifies the desired option 507 and the application continues depending on the option so specified. If the sender specified the cancel option, the e-mail program takes the cancel message option path 509 and the process completes through the terminal labeled as 515. If the sender selected the modify option, the e-mail program takes the modify message option path 511 and the process again completes through the terminal labeled as 515. Finally if the sender decided to neither cancel nor modify the message, the process takes the do nothing option 513 and the process again completes through the terminal labeled 515.

Figure 6A:
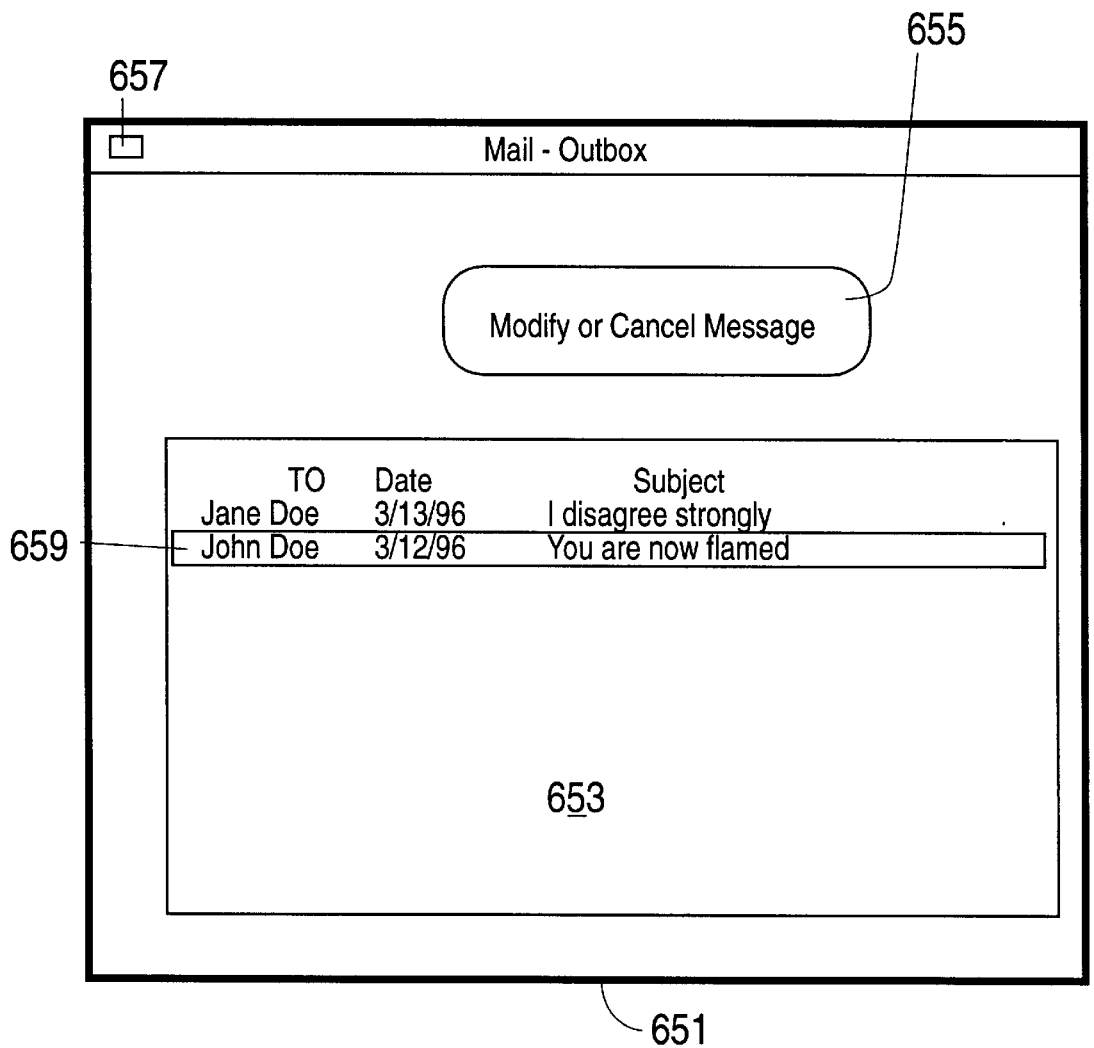
FIGS. 6A–6D illustrate a graphical user interface for selecting a previously-sent message for cancellation or modification in accordance with a preferred embodiment.

FIG. 6A illustrates how the sender selects which previously-sent message to alter according to a preferred embodiment of the invention. The window 651 is presented to the sender. The window 651 includes selectable control areas 655, 657 and a message selection area 653 where information about previously-sent messages is displayed. This information optionally includes the recipient of the message, the date message was sent, and an indication of the subject of the message. The close window selection area 657 allows the user to exit the message modification/cancel process and close the window 651 without performing any operation on a previously-sent message. The user can select a previously-sent message to be modified or canceled by selecting the message 659 and activating the function associated with the Modify or Cancel Message control area 655. Either of the operations evoke a dialog to further specify the desired operation. There are many different possible organizations for the layout of this window 561 and the dialogs discussed below. The selectable control areas may have different labels, be placed at different locations, or even on different dialogs or windows and still be equivalent to the invention. The invention is directed toward the functions and capabilities of handling e-mail messages and of providing an e-mail message that causes some action at the recipients e-mail system and is not directed at the specific GUI used in a particular disclosed embodiment.

Figure 6B:
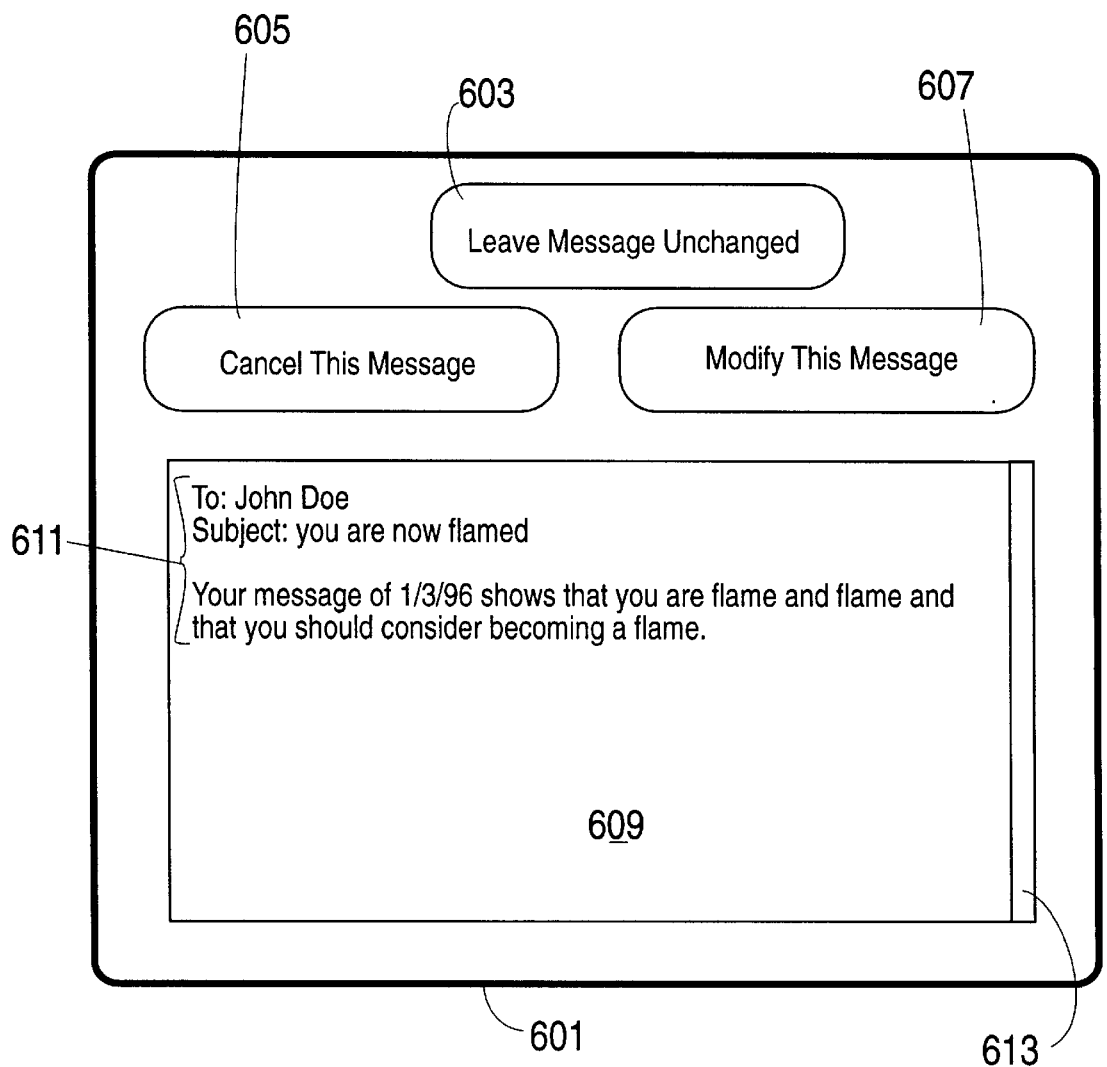
Figure 6C:
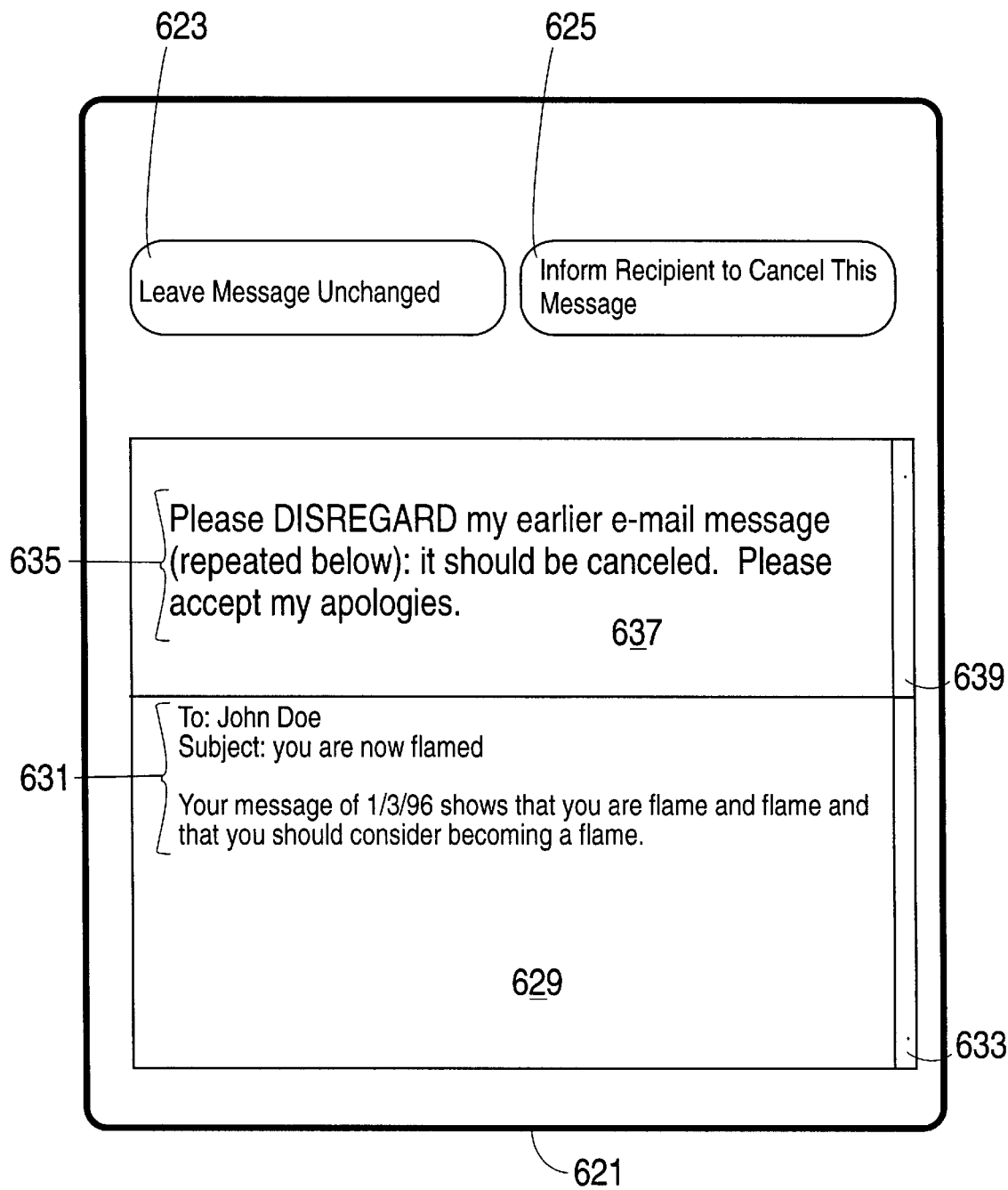

FIG. 6B illustrates how the sender selects the cancel, modify or leave message unchanged functions according to a preferred embodiment. The dialog 601 is presented to the sender. The dialog 601 includes selectable control areas 603, 605, 607 and a text area 609 where the text 611 of the selected previously-sent message 659 is displayed. In this embodiment, the sender selects what operation is desired on the selected previously-sent message 659 displayed in the text area 609, by moving a pointing device over one of the selectable control areas 603, 605, 607 and activating the pointing device. In this manner, the user evokes the command associated with the selected selectable control area. The text area 609 only displays the text 611 of the previously-sent message 659. The sender is not allowed to edit this text 611. However, the text 611 is displayed in a scrollable field 609 so the user can view the entire previously-sent message 659. The scroll control 613 provides the sender with the ability to scroll through the text 611 of the message 659 when the message 659 contains too much text 611 to fit within the text area 609 of the dialog 601. Other embodiments provide different mechanisms to present the selected previously-sent message and to select the disposition of the selected previously-sent message. When activated, the "Leave Message Unchanged" selectable control area 603 closes the dialog 601 without performing any operation on the selected previously-sent message 659. When activated, the "Cancel This Message" selectable control area 605 evokes a display as illustrated in FIG. 6C. When activated, the "Modify This Message" selectable control area 607 evokes a display as illustrated in FIG. 6D.

FIG. 6C illustrates a dialog 621 that is presented to the sender as a result of the sender selecting the "Cancel This Message" selectable control area 605. Like the display shown in FIG. 6B, the text 631 of the selected previously-sent message 659 is displayed in an text area 629. Like the text area 609 of FIG. 6B, the text area 629 in this dialog 621 can not be edited by the sender. However, the dialog also includes an explanatory text area 637 that does allow the user to edit explanatory text it contains. In a preferred embodiment, the explanatory text area 637 is initialized to contain the explanatory text "Please DISREGARD my earlier e-mail message (repeated below): it should be canceled. Please accept my apologies." 635. Other initial messages could be used and still fall within the invention. The sender can edit the explanatory text 635 in this area 637 as desired. If the sender decides to not cancel the selected previously-sent message 659 the sender selects and activates the "Leave Message Unchanged" selectable control area 623 thus closing the dialog 621 without performing any operation on the selected previously-sent message 659. However, if the sender continues to desire to cancel the selected previously-sent message 659, the sender activates the "Inform Recipient to Cancel This Message" selectable control area 625 which activates the process illustrated in FIG. 7A, described below. Upon selection of either selectable control area 623, 625 the dialog 621 is removed from the display. Like the text area 609 of the dialog 601 described in FIG. 6B, the text area 629 contains a scroll control 633 to allow the user to view the entire text of the selected previously-sent message 659. Additionally, the explanatory text area 637 also contains a scroll control 639.

Figure 6D:
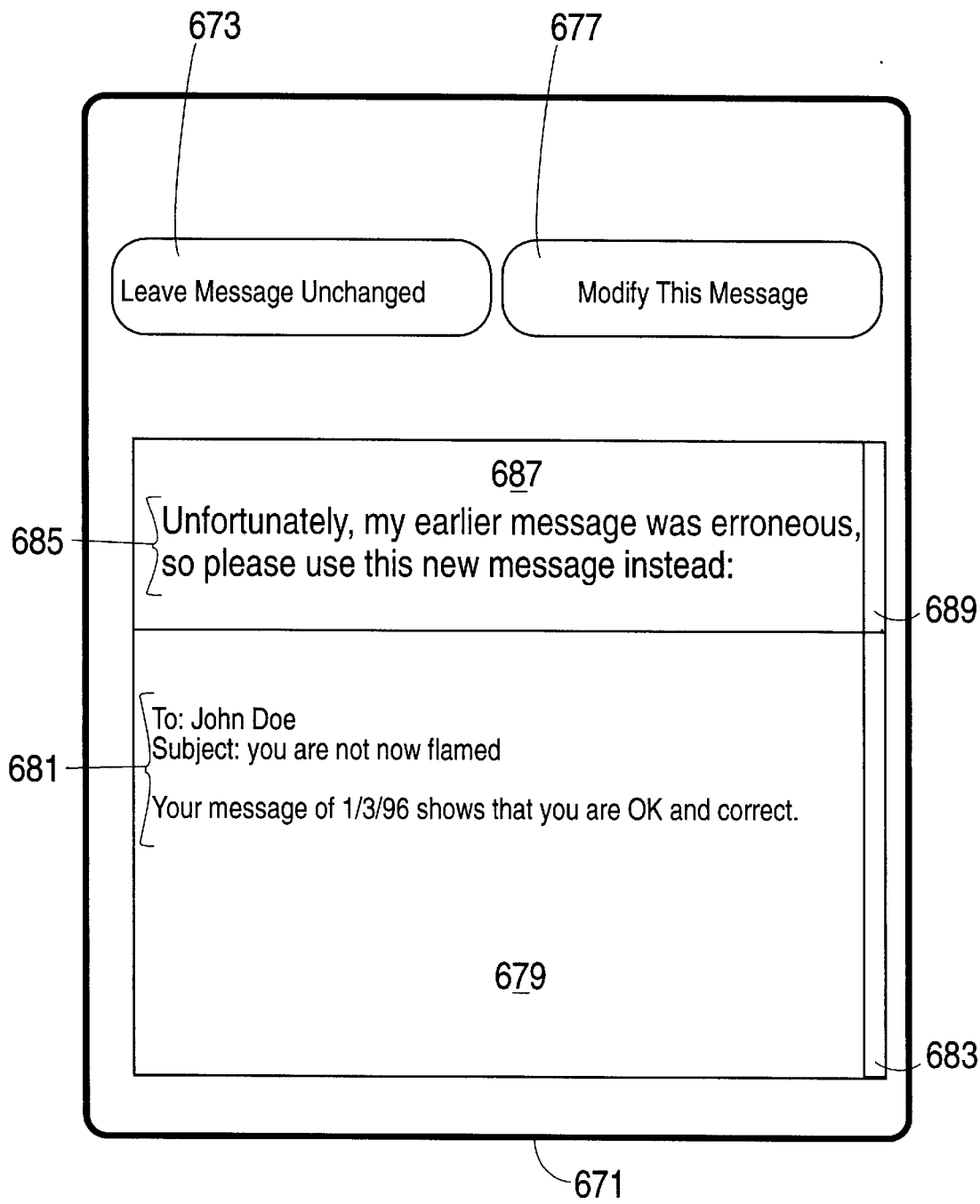

FIG. 6D illustrates a dialog 671 that is presented to the sender as a result of the sender selecting the "Modify This Message" selectable control area 607. Like the display shown in FIG. 6B, the text 681 of the selected previously-sent message 659 is displayed in a text area 679. Unlike the text area 609 of FIG. 6B, the text area 679 in this dialog 671 can be edited by the sender. The dialog 671 also includes an editable explanatory text area 687 that contains explanatory text it. In a preferred embodiment, the explanatory text area 687 is initialized to contain the explanatory text "Unfortunately, my earlier message was erroneous, so please use this new message instead:" 685. Those skilled in the art will understand that other initial messages are contemplated by the invention. The sender can edit this text in these areas 679, 687 to convey the desired meaning. In the illustration shown in FIG. 6D the text 681 has been heavily modified from that of the text 611 of the previously-sent message. If the sender decides to not modify the selected previously-sent message 659, the sender selects and activates the "Leave Message Unchanged" selectable control area 673. However, if the sender continues to desire to modify the selected previously-sent message 659, the sender activates the "Modify This Message" selectable control area 677 which activates the process illustrated in FIG. 7B, described below. Upon selection of either selectable control area 673, 677 the dialog 671 is removed from the display. Similar to the text area 609 of the dialog 601 described in FIG. 6B, this text area 679 contains a scroll control 683 to allow the user to view and edit the entire text of the selected previously-sent message 681. Additionally, the explanatory text area 687 also contains a scroll control 689.

Figure 7A:
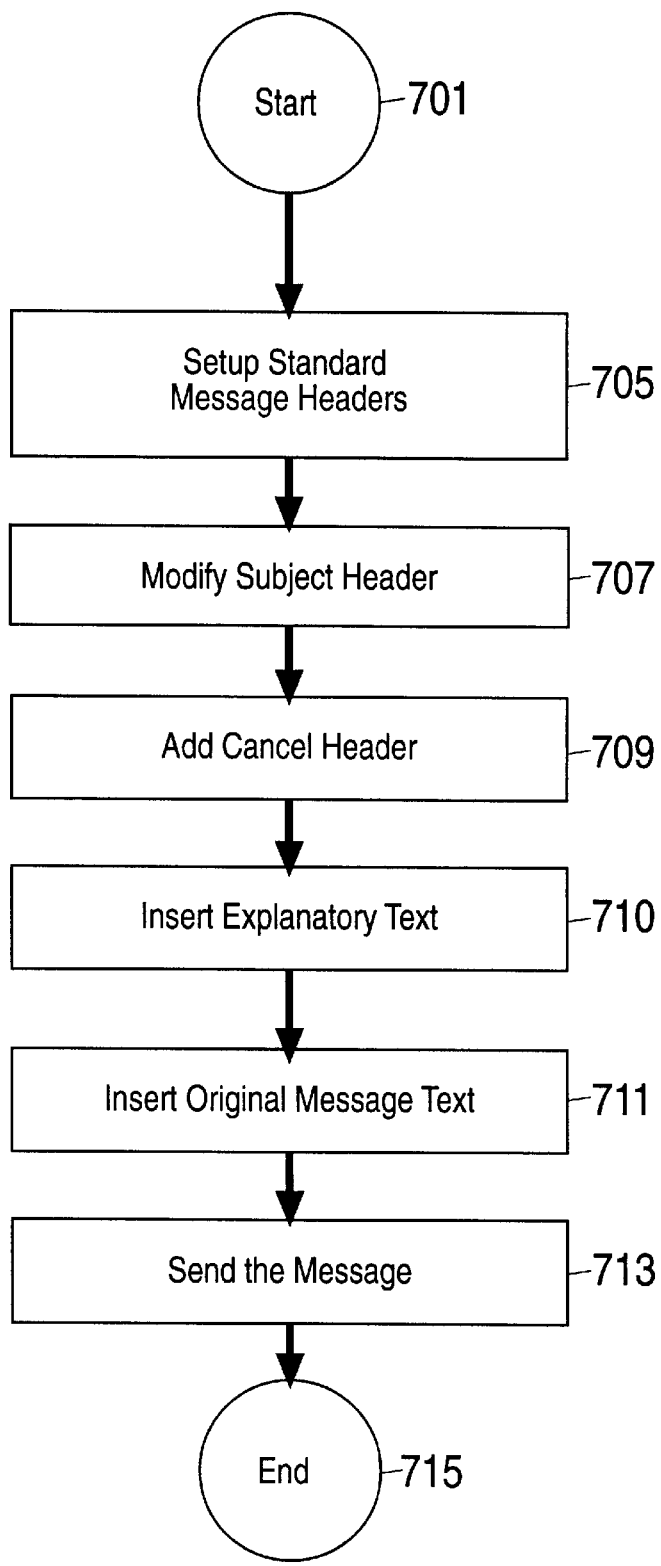
FIGS. 7A–7B illustrate the process for creating a cancel and modify message respectively in accordance with a preferred embodiment.

FIG. 7A illustrates the process initiated when a user cancels a selected previously-sent message 659. The process starts at the terminal block labeled 701 after the sender has activated the "Inform Recipient to Cancel This Message" selectable control area 625. The process then generates the required headers for the cancel message 705 where appropriate using information from the selected previously-sent message. The headers that are directly copied from the selected previously-sent message 659 include the To:, From:, Cc:, and Bcc: headers. The Date: field-body is set to the current date and time, and the Message-ID: field-body is set to a unique identifier value for the cancel message (this identifier is not the same as the identifier for the selected previously-sent message 659). The invention also uses the field-body data from the Subject: and Message-ID: fields of the selected previously-sent message 659 as described below. One embodiment of the invention uses encryption to provide authentication protection to the previously-sent message. The headers required to provide the authentication facility are also inserted at this time.

Next 707 the process generates a Subject: field for the cancel message based on the subject field of the selected previously-sent message 659. The Subject: field for the cancel message starts with the text "CANCEL" followed by a space and then followed by the text contained in the subject field-body of the previously-sent message. Thus, the subject header of the cancel message for the selected previously-sent message 659 shown in FIG. 6A is:

Subject: CANCEL You are now flamed

Next 709 the process inserts a X-Cancel: header. The X-Cancel: field-body is set to the contents of the Message-ID: field-body of the selected previously-sent message 659 that is the target of the cancel operation. The Message-ID: field-body, as used in RFC822, contains a unique identifier that refers to a particular message. Thus, no two messages have the same message identifier. Hence, the X-Cancel: field-body contains the unique identification of the targeted previously-sent message 659. Those skilled in the art will understand that the invention encompasses the use of other user defined fields or RFC822 extensions that may be used to affect the invention.

Next, 710, a blank line, to separate the RFC822 header fields from the body of the message, and the text 635 within the explanatory text area 637, as possibly modified by the sender, is inserted into the body of the cancel message.

Now 711, the text of the selected previously-sent message 659 is included in the body of the cancel message. This is accomplished by inserting a line of separation text to indicate the start of the included message. An example line of separation text is:

Text of the Original Message

This line is followed by the text of the selected previously-sent message 659. In a preferred embodiment the text includes the headers from the selected previously-sent message 659 that the recipient would have seen (for example, the Bcc: header would not be included in this text, nor would any route tracking headers).

The cancel message is completed by including a line of separation text to indicate the end of the included message. An example line of separation text is:

End of the Original Message

Finally 713, the cancel message is sent to the recipient using prior art methods in the same manner as the previously-sent message 659 was sent and the process completes through the terminal labeled as 715.

Figure 7B:
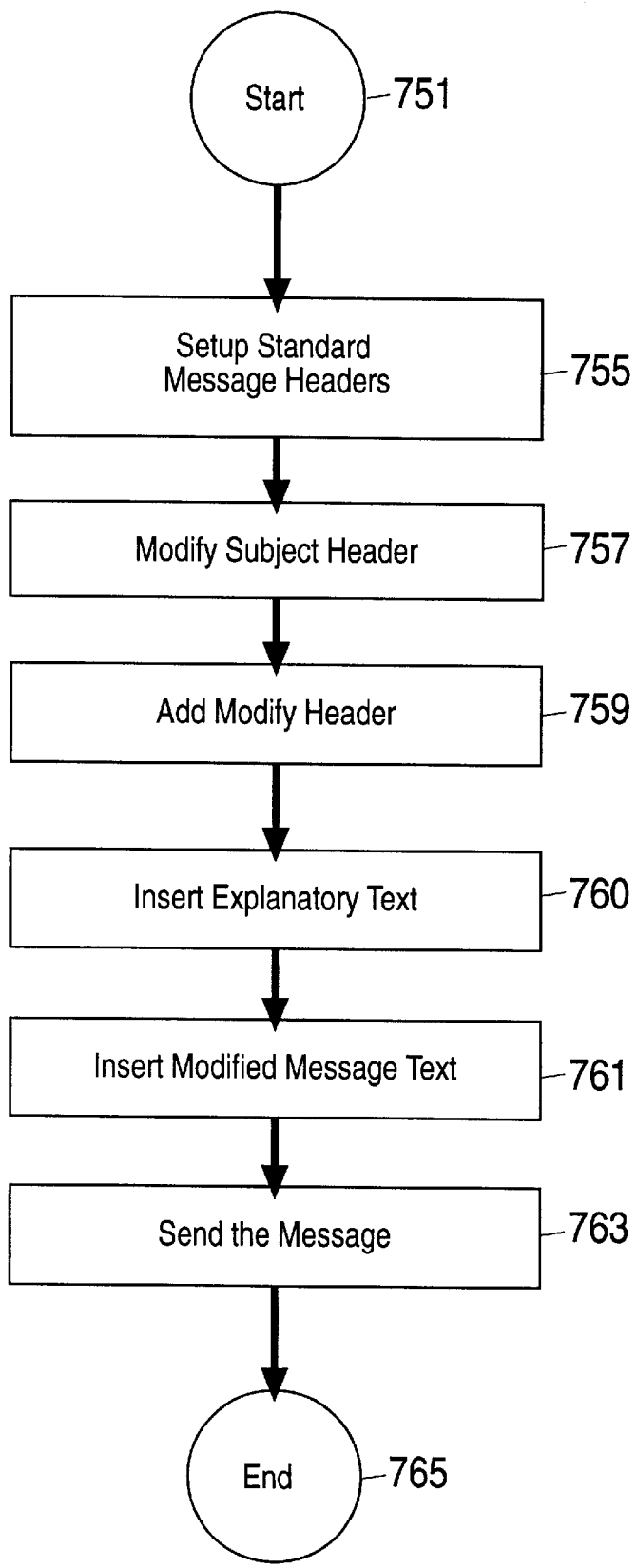

FIG. 7B illustrates the process initiated when a user modifies a selected previously-sent message 659. The process starts at the terminal block labeled as 751 after the sender has activated the "Modify This Message" selectable control area 677. The process then generates the required headers for the modify message 755 where appropriate using information from the selected previously-sent message 659. The headers directly copied from the selected previously-sent message 659 include the To:, From:, Cc:, and Bcc: fields. The Date: field-body is set to the current date and time, and the Message-ID: field-body is set to a unique message value for the modify message (this message value is not the same as the message value for the selected previously-sent message 659). The invention also uses the field-body data from the Subject: and Message-ID: fields of the selected previously-sent message 659 as described below. One embodiment of the invention uses encryption to provide authentication protection to the previously-sent message. The headers required to provide the authentication facility are also inserted at this time.

Next 757 the process generates a Subject: field for the modify message based on the subject field-body of the selected previously-sent message 659. The Subject: field-body for the modify message starts with the text "MODIFY" followed by a space and then followed by the data of the subject field-body of the selected previously-sent message 659. Thus, the subject header in the modify message for the selected previously-sent message 659 shown in FIG. 6A is:

Subject: MODIFY You are now flamed

Next 759 the process inserts a X-Modify: header. The X-Modify: field-body is set to the contents of the Message-ID: field-body of the selected previously-sent message 659 that is the target of the modify operation. Thus, the X-Modify: field-body contains the unique identification of the targeted previously-sent message 659. Those skilled in the art will understand that the invention encompasses the use of other user defined fields or RFC822 extensions that may be used to affect the invention.

Next, 760, a blank line, to separate the RFC822 header fields from the body of the message, and the text 685 in the explanatory text area 687, as possibly modified by the sender, is inserted into the body of the modify message.

Now 761 the text of the selected previously-sent message 659, as modified by the user as described for FIG. 6D, is inserted into the modify message body. This is accomplished by inserting a line of separation text to indicate the start of the included message. An example line of separation text is:

Text of the Modified Message
This line is followed by the modified text 681 based on the selected previously-sent message 659. In a preferred embodiment the text includes the headers from the selected previously-sent message 659 that the recipient would have seen (for example, the Bcc: header would not be included in this text, nor would any route tracking headers).

The modify message is completed by including a line of separation text to indicate the end of the modified message. An example line of separation text is:

End of the Modified Message

Finally 763, the modify message is sent to the recipient using prior art methods in the same manner as the previously-sent message 659 was sent and the process completes through the terminal labeled as 765.

The previous discussion has disclosed the invention as it relates to the sending e-mail system. Action messages constructed according to the above described invention can be sent to a prior art e-mail system. In this case, the X-Cancel:, the X-Modify:, and the modified Subject: fields are all displayed to the recipient. This informs the recipient of the sender's intent, but goes no further and does not delete or modify the selected previously-sent message 659. Thus, while the invention as disclosed above is useful, it is further enhanced by modifying the receiving e-mail system to specially process the modify and cancel messages. These enhancements are disclosed below starting with the databases used by a preferred embodiment.

Databases used with a Preferred Embodiment of the Invention

As mentioned above, the sending e-mail system retains copies of the messages that have been sent in the sender's outbox. This information is stored using prior art techniques and is not further discussed.

A receiving e-mail system utilizing the invention must track received messages. This tracking is implemented by maintaining three databases. Those skilled in the art will recognize that the number of databases is not important to the invention, rather the information contained in the records of the invention is of relevance. Thus, although the preferred embodiment, described below, uses three databases, the invention can be practiced with one, two or in some instances more than three databases.

Figure 8A:
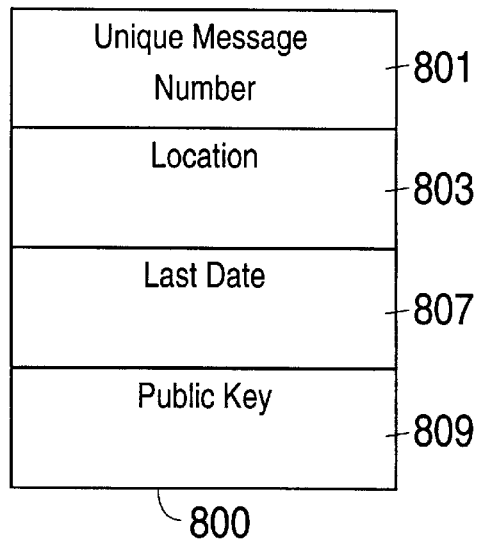
FIGS. 8A–8C illustrate the data record formats for the message database, the cancel database and the modify database in accordance with a preferred embodiment.

FIG. 8A illustrates the format of the records in the Message database. The message database tracks which messages have been received and the location where the message is currently stored. As described above, messages are initially stored in the recipient's inbox. However, once the recipient has read the message the recipient may decide to either delete the message or store the message in some location other than the inbox. The receiving e-mail system creates a record 800 for each previously-sent message that the receiving e-mail system receives and places in the recipient's inbox. One field 801 of the record 800 stores the unique message number that was contained in the field-body of the Message-ID: header field for the previously-sent message. This allows the receiving e-mail system to unambiguously identify a previously-sent message. The location where the previously-sent message is stored is kept in the location field 803. If the message, identified by the value in the unique message number field 801, has been deleted, the location field 803 will be NIL. This situation will occur when handling duplicate cancel messages. The last date field 807 contains the last date that the record was used. The last date field 807 is used to monitor how long the record has been inactive. In a preferred embodiment, the record 800 is deleted if it has been inactive for more than a month. The process of deleting the record 800 is described below and illustrated in FIG. 8D. In another preferred embodiment the public key field 809 holds a pubic key value for RSA encryption purposes.

Figure 8B:
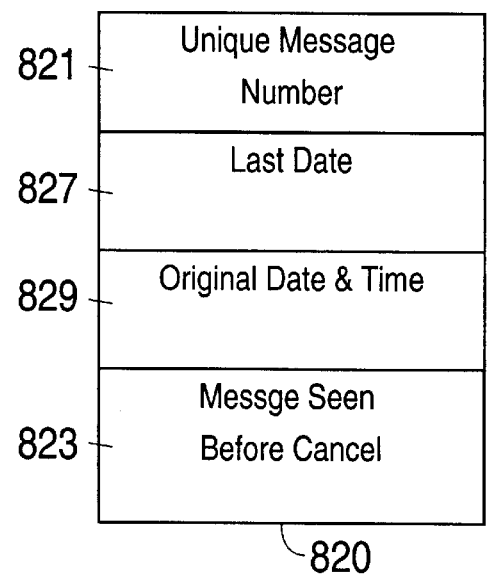

FIG. 8B illustrates the format of the records in the Cancel database. The cancel database tracks what previously-sent messages have been (or are to be) canceled. Those skilled in the art will understand that the Internet may deliver a message containing the X-Cancel: field to the recipient prior its delivery of the previously-sent message even though the previously-sent message was submitted to the Internet before the cancel message was submitted to the Internet. Further, those skilled in the art will understand that the Internet may deliver duplicate copies of the previously-sent message (and duplicate copies of the cancel message). Thus, the cancel database is used to store information relating to the cancel function so that the invention can handle duplicates of the cancel message. Like the message record 800 the cancel record 820 includes a field that contains the unique message number 821 that contains the message identifier of the previously-sent message that is to be canceled. The last date field 827 contains the last date that the record was used. The last date field 827 is used to monitor how long the record has been inactive. In a preferred embodiment, the record 820 is deleted if it has been inactive for more than a week. The process of deleting the record 820 is described below and illustrated in FIG. 8D. The original date and time field 829 is used to store the date and time of the construction (fabrication) of the cancel message. This date and time value is provided in the field-body of the Date: header of the cancel message. If for some reason the cancel message does not have a Date: header, the date and time when the cancel message was received is used. The original date and time field 829 is used to compensate for the case of receiving multiple copies of the cancel message. The message seen field 823 is initially set FALSE, but is set TRUE if the recipient has viewed the previously-sent message before it was canceled.

Figure 8C:
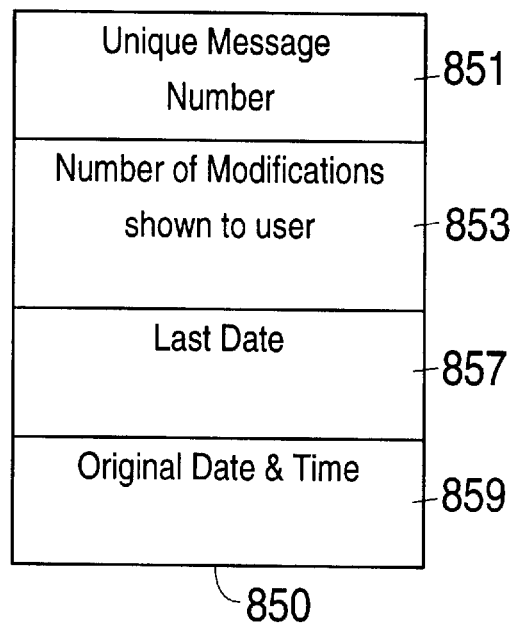

FIG. 8C illustrates the format of the records in the Modify database. The modify data base tracks what previously-sent messages have been (or are to be) modified. Those skilled in the art will understand that the Internet may deliver a message containing the X-Modify: field to the recipient prior to its delivery of the previously-sent message even though the previously-sent message was submitted to the Internet before the modify message was submitted to the Internet. Further, those skilled in the art will understand that the Internet may deliver duplicate copies of the previously-sent message (and duplicate copies of the modify message). Thus, the modify database is used to store information relating to the modify function so that the invention can handle duplicates of the modify message. Like the message record 800 the modify record 850 includes a field that contains the unique message number 851 that is the message identifier of the previously-sent message that is to be modified. The number of modifications shown to user field 853 is used to keep track of the number of times the user has been notified of different modifications performed on the previously-sent message. The last date field 857 contains the last date that the record was used. This field 857 is used to monitor how long the record has been inactive. In a preferred embodiment, the record 850 is deleted if it has been inactive for more than a week. The process of deleting the record 850 is described below and illustrated in FIG. 8D. The original date and time field 859 is used to store the date and time of the construction (fabrication) of the modify message. The date and time value is provided in the field-body of the Date: header of the modify message. If for some reason the modify message does not have a Date: header, the date and time when the message was received is used. The original date and time field 859 is used to compensate for the case of receiving multiple copies of the modification message.

Figure 8D:
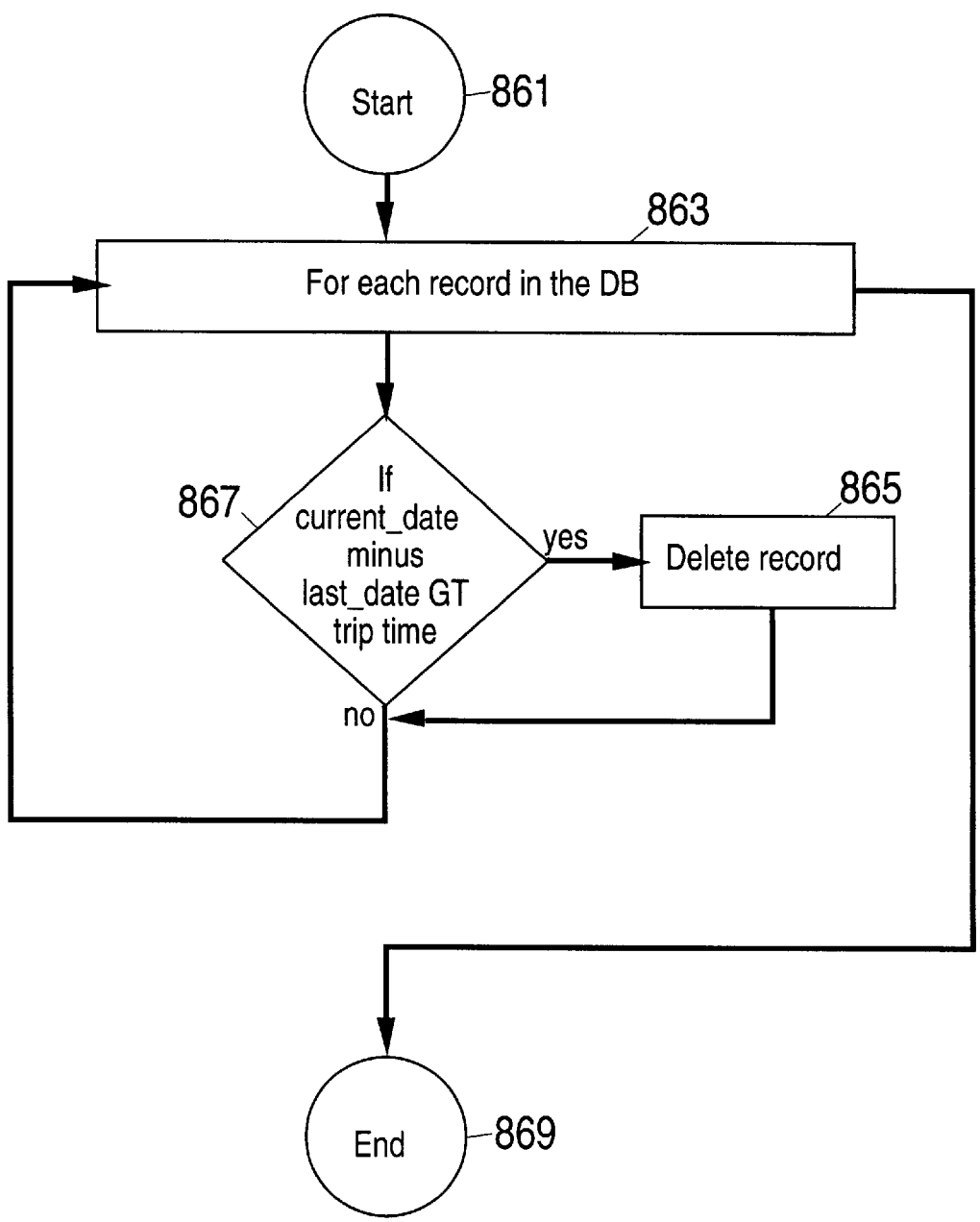
FIG. 8D illustrates the process used to maintain the databases in accordance with a preferred embodiment.

Finally, FIG. 8D illustrates a periodic maintenance process for these databases. The result of this maintenance process is that unused records are deleted from the database thus pruning the database to help control its size. This process is invoked periodically during a period of low computer activity. A preferred embodiment invokes this process every day at 2:10 a.m. This process starts at the terminal labeled as 861. Then 863 each record 800, 820, 850 in these databases is examined 867 to determine if record 800, 820, 850 has not been updated for longer than some trip time. This determination is based on the current date and the date within the last date field 807, 827, 857 of the record 800, 820, 850 being examined. If the record 800, 820, 850 has been inactive for longer then the trip time, the record 800, 820, 850 is deleted 865. This loop continues for all the records 800, 820, 850 in these databases and once the last record is examined the process exits through the terminal labeled as 869.

Now that the databases used by the receiving e-mail system are described, we discuss additional aspects of the invention within the receiving e-mail system.

Receiving a Previously-sent Message

Figure 9:
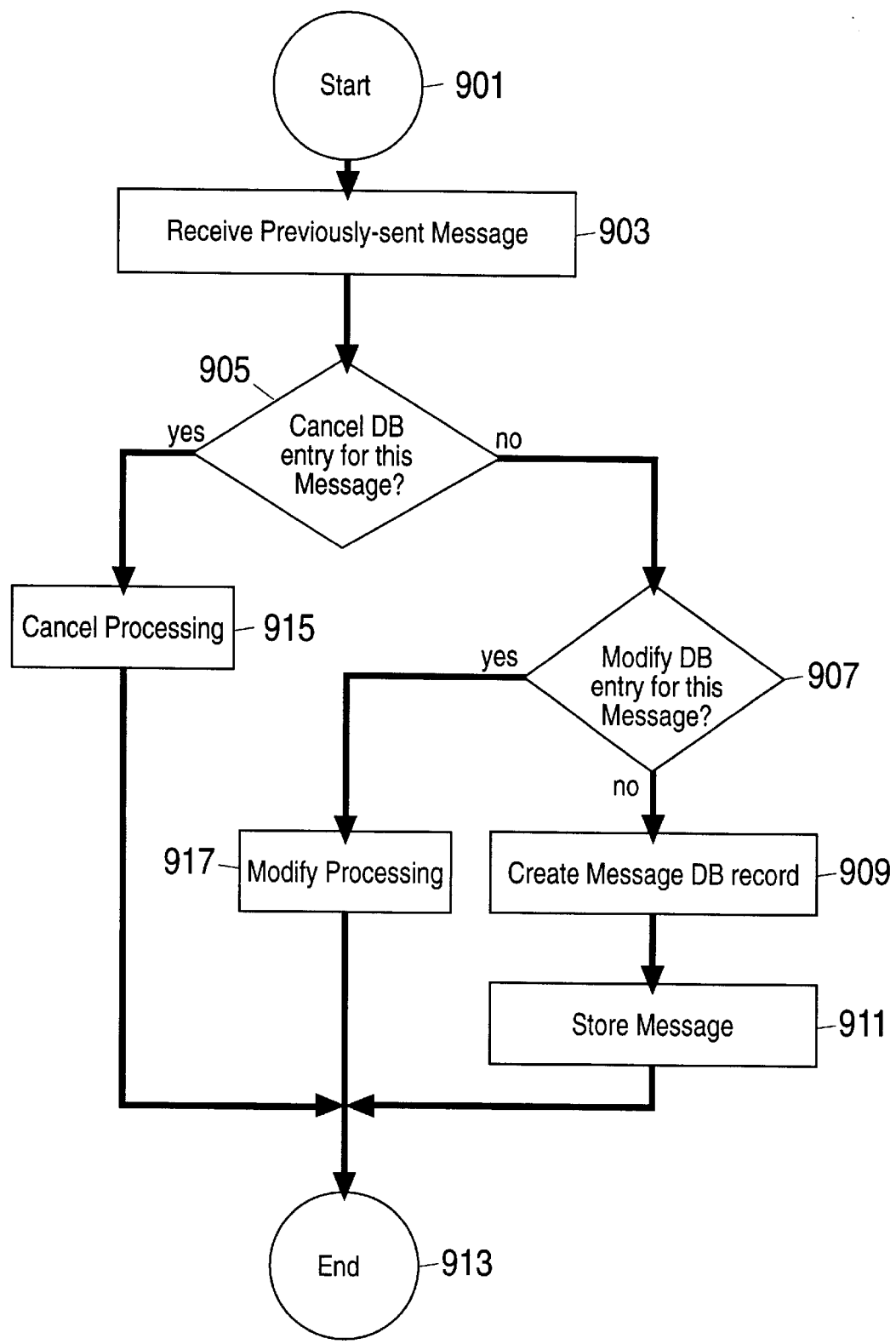
FIG. 9 illustrates the process used by a receiving e-mail system when receiving a previously-sent message in accordance with a preferred embodiment.

A receiving e-mail system utilizing the invention performs operations beyond those of the prior art when receiving messages. FIG. 9 illustrates how a previously-sent message is altered by such an e-mail system. The process starts at the terminal labeled as 901. Then the previously-sent message is received 903 and the cancel database is examined 905 to see if a record 820 matches with the message identification of the instant previously-sent message. Often, a previously-sent message is received and the sender has not canceled, nor modified the previously-sent message. In this case, no matching record 820 will be found in the cancel database. Next, the modify database is examined 907 to see if a record 850 matches with the message identification of the instant message. Again, in this case no matching record 850 will be found. Thus, the receiving e-mail system only creates 909 a record 800 in the message database and stores the previously-sent message within the users inbox (or wherever the recipient's e-mail system stores incoming messages) 911. The unique message number field 801 of the record 800 is set to the information contained within the Message-ID: field-body of the previously-sent message. The location field 803 is set to the location of where the previously-sent message is stored (e.g., the recipient's inbox). The last date field 807 is set to the current date. The process completes through the terminal labeled as 913. If the previously-sent message contains a public key header, as described below, the public key field-body contents are saved in the public key field 809.

Now we examine the case where the sender has canceled a previously-sent message, and the cancellation action message has arrived at the receiving e-mail system prior to the receipt of the previously-sent message. In this case, the process again starts at the terminal labeled as 901 and the previously-sent message is received 903. Then the cancel database is examined 905 to see if a record 820 matches with the message identification of the instant message. In this case a match will be found, cancel processing 915 performed and the process completes through the terminal labeled 913. The details of the cancel processing 915 are described below.

Finally we examine the case where the sender has modified a previously-sent message, and the modification action message has arrived at the receiving e-mail system prior to the receipt of the previously-sent message. In this case, the process again starts at the terminal labeled 901 and the previously-sent message is received 903. Then the cancel database is examined 905 to see if a record 820 matches with the message identification of the instant message. In this case no match will be found. Next, the modify database is examined 907 to see if a record 850 matches with the message identification of the instant message. In this case a match will be found, modify processing 917 performed and the process completes through the terminal labeled 913. The details of modify processing 917 are described below.

Cancel Processing

Figure 10A:
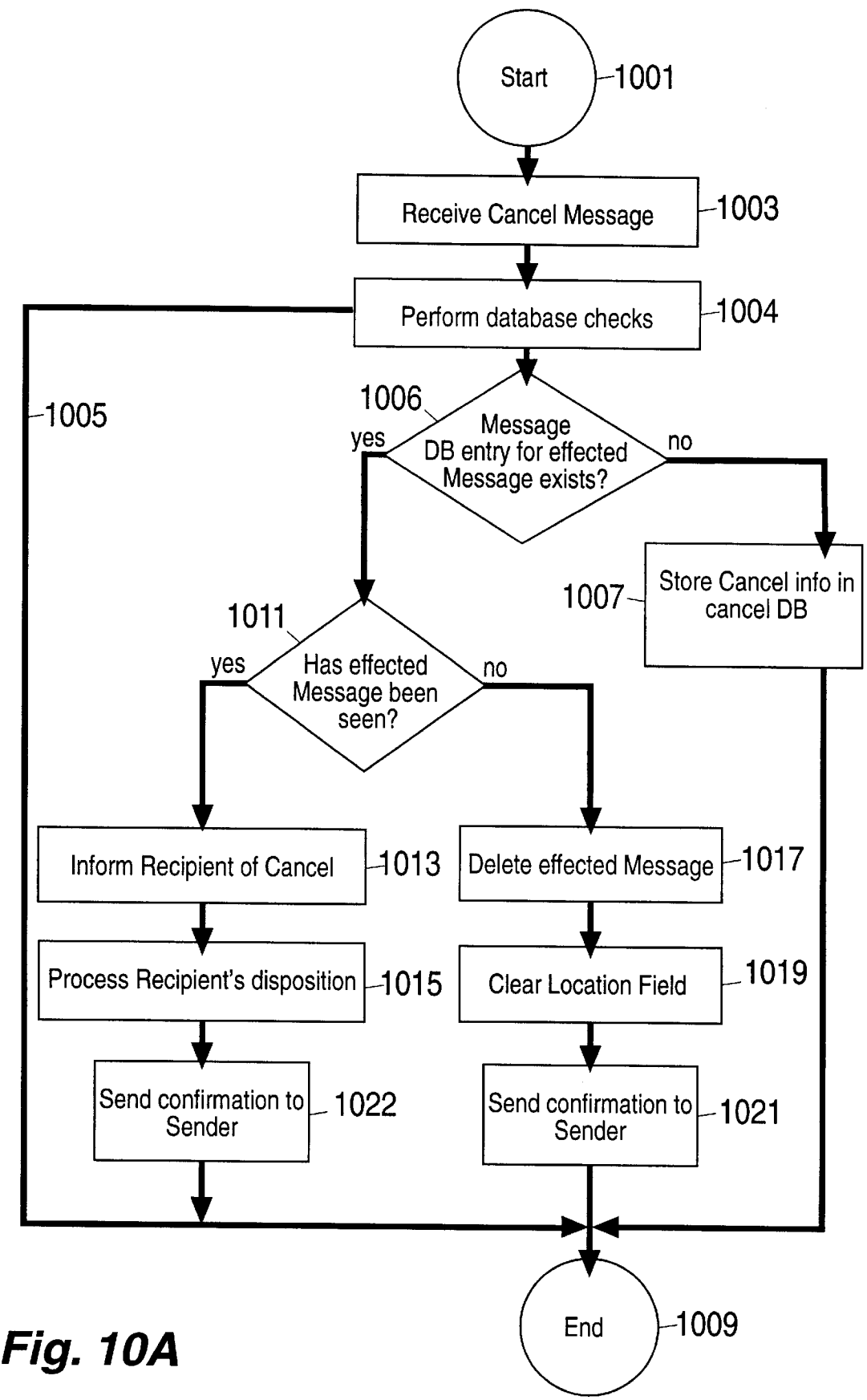
FIG. 10A illustrates the process used by a receiving e-mail system when receiving a cancel message in accordance with a preferred embodiment.
Figure 10B:
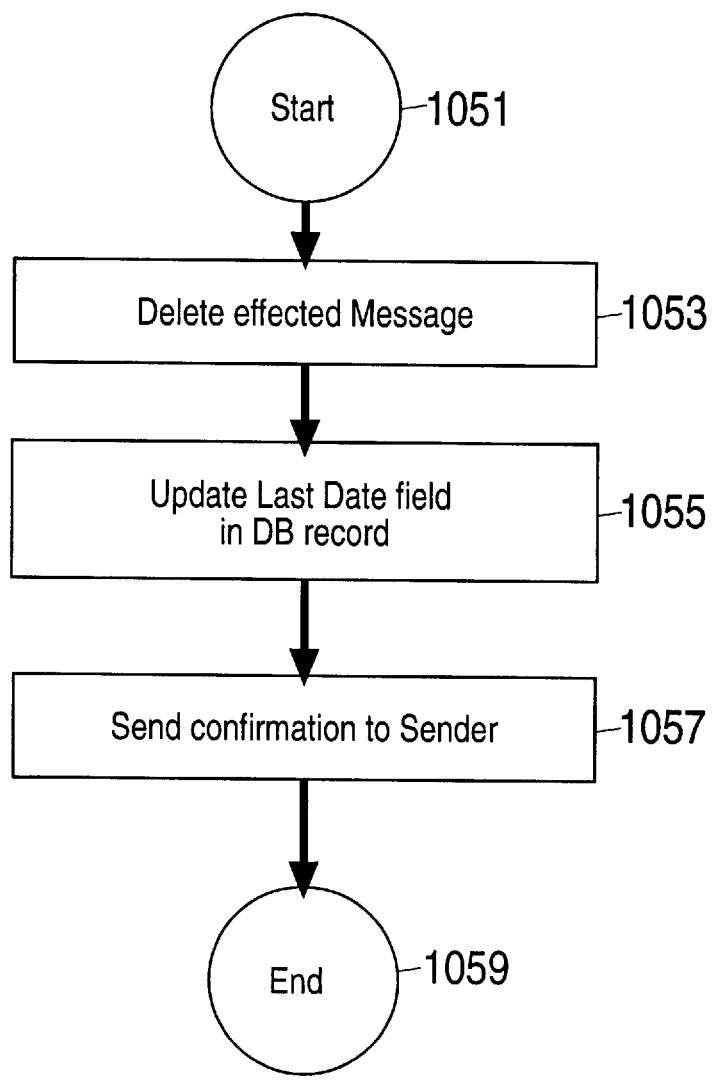
FIG. 10B illustrates the process used by a receiving e-mail system when receiving a previously-sent message after having received a cancel message in accordance with a preferred embodiment.

FIGS. 10A and 10B illustrate how a cancel message is processed. There are two aspects of cancel processing. The first aspect is the processing of a received cancel message. The second aspect is the processing involved when receiving a previously-sent message after receipt of the corresponding cancel message.

FIG. 10A illustrates how a receiving e-mail system processes the receipt of a cancel message. Processing starts at the terminal labeled as 1001 when the receiving e-mail system receives 1003 a message containing an X-Cancel: header field. The receiving e-mail system first performs checks on the databases 1004. These database checks are described below. If the database check determines that nothing further is to be done with the cancel message, processing completes through the terminal labeled as 1009 as indicated by the arrow labeled as 1005. If the database check allows further processing the value of the X-Cancel: field-body is extracted from the cancel message and used to determine whether the message database contains an entry for the previously-sent message subject to the cancellation 1006. The fact that the message database contains such an entry implies that the previously-sent message subject to cancellation has arrived at the receiving e-mail system prior to the arrival of the cancel message. If the message database does not contain a matching entry the information in the cancel message is stored in the cancel database 1007 and the process completes through the terminal labeled 1009. In this circumstance, the previously-sent message has not yet arrived.

However, if the previously-sent message subject to the cancellation has already been received by the receiving e-mail system prior to the receipt of the cancel message, the X-Cancel: field-body value will find a match in the message database 1006. Once the previously-sent message is received by the receiving e-mail system, it is stored in the recipient's inbox. The recipient may, for a number of reasons, not examine the message for some time. The inbox maintains information as to whether the recipient has seen the message. Processing continues dependent on whether the recipient has seen the message 1011. If the recipient has not yet seen the message, the previously-sent message is deleted from the inbox 1017 and the location field 803 field in the record 800 corresponding to the message in the message database is cleared 1019. Next 1021 the recipient's e-mail system returns a confirmation message to the sender of the previously-sent and cancel messages indicating that the message has been canceled and has not been seen by the recipient. Finally the process completes through the terminal block labeled as 1009.

If the previously-sent message has been seen by the recipient 1011 (as described below for FIG. 11A), the receiving e-mail system informs the recipient that the message was canceled 1013. The recipient is given a number of choices as what to do with the previously-sent message 1015. These options include but are not limited to deleting the original message or treating the cancel message as a normal message. If the recipient decides to delete the original message, the recipient's e-mail program uses the location field 803 in the message database record 800 to find and delete the message and to clear the location field 803. Further, the message seen field 823 of the associated cancel record 820 is set to TRUE. Next 1022 the recipients e-mail system returns a confirmation message to the sender of the previously-sent and cancel messages indicating that the message has been canceled but that the recipient has seen the canceled message prior to cancellation. Finally, the process completes through the terminal labeled as 1009.

FIG. 10B details the cancel message processing mentioned above relating to element 915 of FIG. 9. To review, a previously-sent message has arrived at the receiving e-mail system and there exists an entry in the cancel database having a unique message number 851 that matches the Message-ID: field-body of the just received previously-sent message. The intended recipient of the previously-sent message has not yet seen the previously-sent message. Processing starts at the terminal labeled as 1051. Next, the receiving e-mail system removes the just received previously-sent message from the system 1053 without storing the previously-sent message. Then 1055, the last date field 827 in the relevant canceled database record 820 is set to the current date. Finally, the receiving e-mail system sends 1057 the originator a confirmation message indicating that the previously-sent message was canceled without being seen by the recipient. The process completes through the terminal labeled as 1059.

A final note about the cancel database. In a preferred embodiment, a record 820 with a last date field 827 older than seven days is deleted by the process illustrated by FIG. 8D. Again, those skilled in the art will recognize that the seven day record aging can be considerably longer or shorter and still practice the invention.

Modify Processing

Figure 11A:
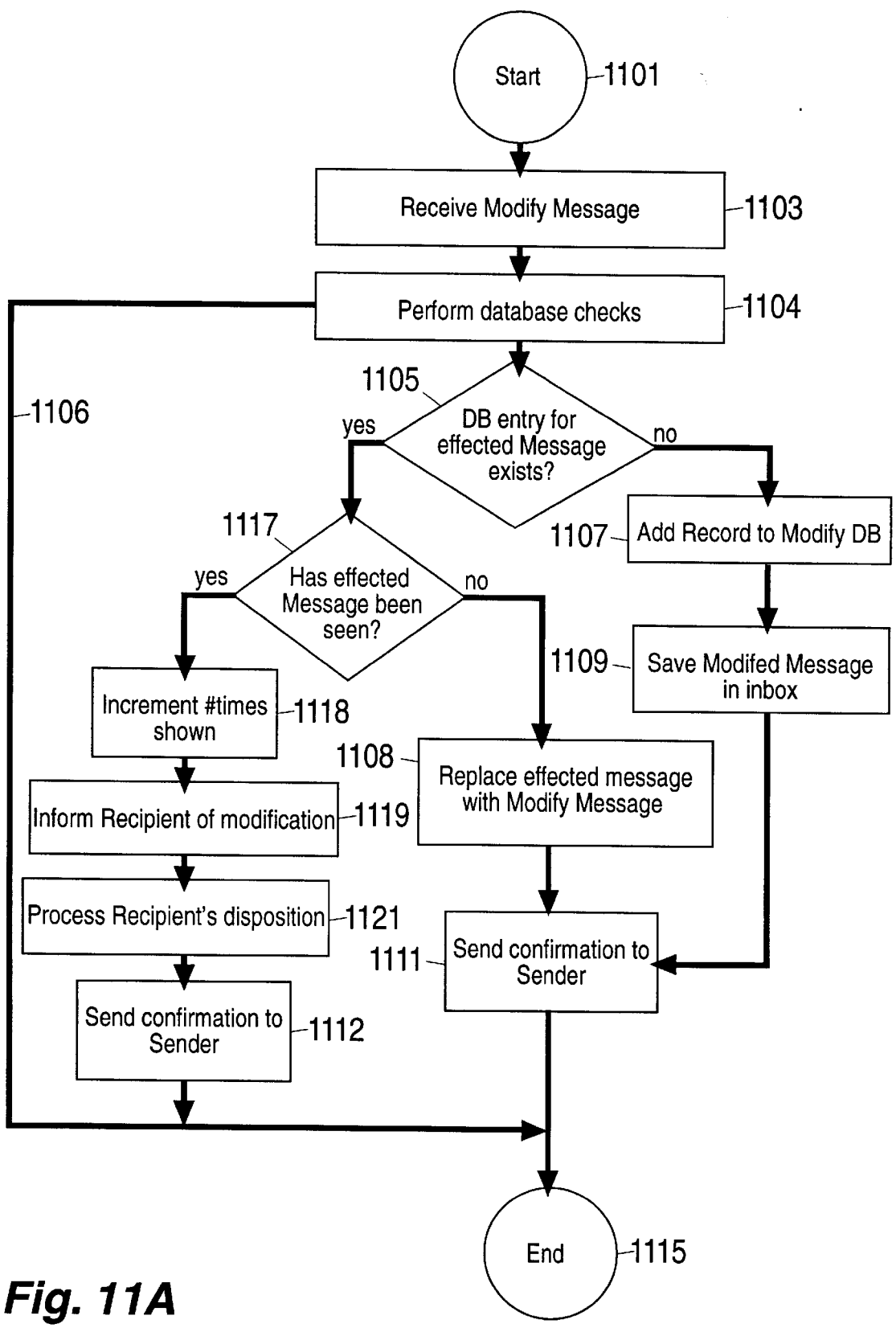
FIG. 11A illustrates the process used by a receiving e-mail system when receiving a modify message in accordance with a preferred embodiment.
Figure 11B:
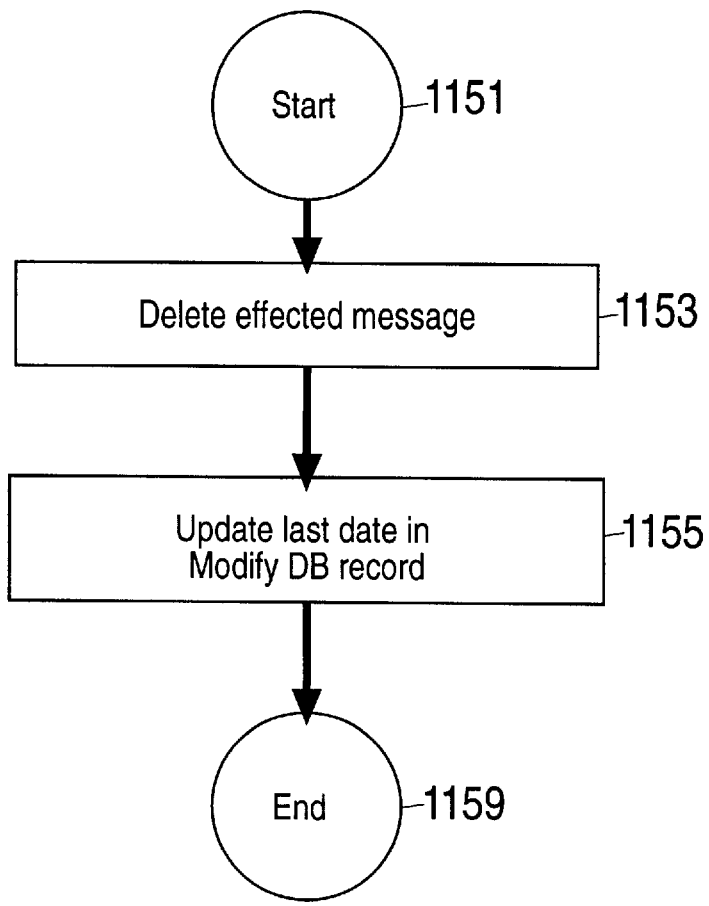
FIG. 11B illustrates the process used by a receiving e-mail system when receiving a previously-sent message after having received a modify message in accordance with a preferred embodiment.

FIG. 11A and 11B illustrate how a modify message is processed. There are two aspects of modify processing. The first aspect is the processing of a received modify message. The second aspect is the processing involved when receiving a previously-sent message.

FIG. 11A illustrates how a receiving e-mail system processes the receipt of a modify message. The processing starts at the terminal labeled as 1101 when the receiving e-mail system receives 1103 a message containing an X-Modify: header field. The receiving e-mail system first performs checks on the databases 1104. These database checks are described below. If the database check determines that nothing further is to be done with the modify message, processing completes through the terminal labeled as 1115 as indicated by the arrow labeled as 1106. If the database check allows further processing the value of the X-Modify: field-body is extracted from the modify message and used to determine whether the message database contains an entry for the previously-sent message that is being modified 1105. If the message database contains such an entry it means that the previously-sent message being modified has arrived at the receiving e-mail system prior to the arrival of the modify message. If the message database does not contain a matching entry (meaning that the previously-sent message has not yet arrived) the information in the modify message is stored in the modify database 1107 and the content of the modify message stored in the recipient's inbox 1109. Next, the receiving e-mail system sends a confirmation 1111 to the sender of the previously-sent message confirming that the modification has been made and that the recipient has not seen the previously-sent message. The process completes through the terminal labeled 1115.

However, if the previously-sent message had already been received by the receiving e-mail system prior to the receipt of the modify message, the X-Modify: field-body value will find a match in the message database 1105. Once the previously-sent message is received by the receiving e-mail system, it is stored in the recipient's inbox. The recipient may, for a number of reasons, not examine the message for some time. The inbox maintains information as to whether the recipient has seen the message. Processing continues dependent on whether the recipient has seen the message 1117. If the recipient has not yet seen the message the previously-sent message is deleted from the inbox 1108 and the modified text of the previously-sent message contained within the modify message is saved in the recipient's inbox. Next 1111 the recipients e-mail system returns a confirmation message to the sender of the previously-sent and modify messages indicating that the previously-sent message has been modified and the recipient has not seen it. Finally the process completes through the terminal block labeled as 1115.

If the previously-sent message has been seen by the recipient 1117, the number of modifications shown field 853 in the modified database record 850 is increased by one 1118 and the receiving e-mail system informs the recipient that the message was modified 1119. If the value in the number of modifications shown field 853 is greater than one, indicating that the user has seen prior modifications of the previously-sent message, the recipient is informed that the present modification is a new and different modification than the prior modifications and displays the number of modifications the recipient has seen (that is, the value of the modifications shown field 853). The recipient is given a number of choices as what to do with the previously-sent message 1121. These options include but are not limited to deleting the original message or treating the modify message as a normal message. If the recipient decides to delete the original message, the recipient's e-mail program uses the location field 803 in the message database record 800 to find and delete the message. Next 1112 the recipients e-mail system returns a confirmation message to the sender of the previously-sent and modify messages indicating that the message has been modified and the recipient has seen the previously-sent message before it was modified. Finally, the process completes through the terminal labeled as 1115.

To determine whether the previously-sent message has been seen by the recipient 1011, 1117, the process first checks whether the previously-sent message is available by checking the location field 803 of the record 800 associated with the message. If the message is available then check if the previously-sent message has been seen by the recipient by examining the recipient's inbox. If the previously-sent message still exists in the recipient's inbox, the status of the message provides the result whether the recipient has seen the message. Further, if the location field 803 is not the inbox, the recipient has seen the message.

If the inbox does not contain the message and if the previously-sent message is not available (e.g., the location field 803 contains NIL), then check the cancel database for a record 820 having the same unique message number 821 as the value in the X-Modify: field-body of the modify message. If such a record 820 exists, then check the message seen before cancel field 823. If the value of this field 823 is TRUE, the message has been seen and if FALSE the message has not been seen. Otherwise, the recipient has seen the previously-sent message and has deleted it.

FIG. 11B details the modify message processing mentioned above relating to element 917 of FIG. 9. To review, a previously-sent message has just arrived at the recipient's e-mail system and there is an entry in the modify database that matches the Message-ID of the just arrived previously-sent message. The intended recipient of the previously-sent message has not yet seen the message. Processing starts at the terminal labeled 1151. Next, the receiving e-mail system removes the just received previously-sent message from the system 1153 without having stored the message in anyone's inbox. Then 1155 the last date field 857 in the relevant modified database record 850 is updated. Finally, the process completes through the terminal labeled as 1159.

A final note about the modified database. In a preferred embodiment, a record 820 with a last date field 857 older than seven days is deleted by the process illustrated by FIG. 8D. Again, those skilled in the art will recognize that the seven day record aging can be considerably longer or shorter and still practice the invention.

Database Checks

Figure 12:
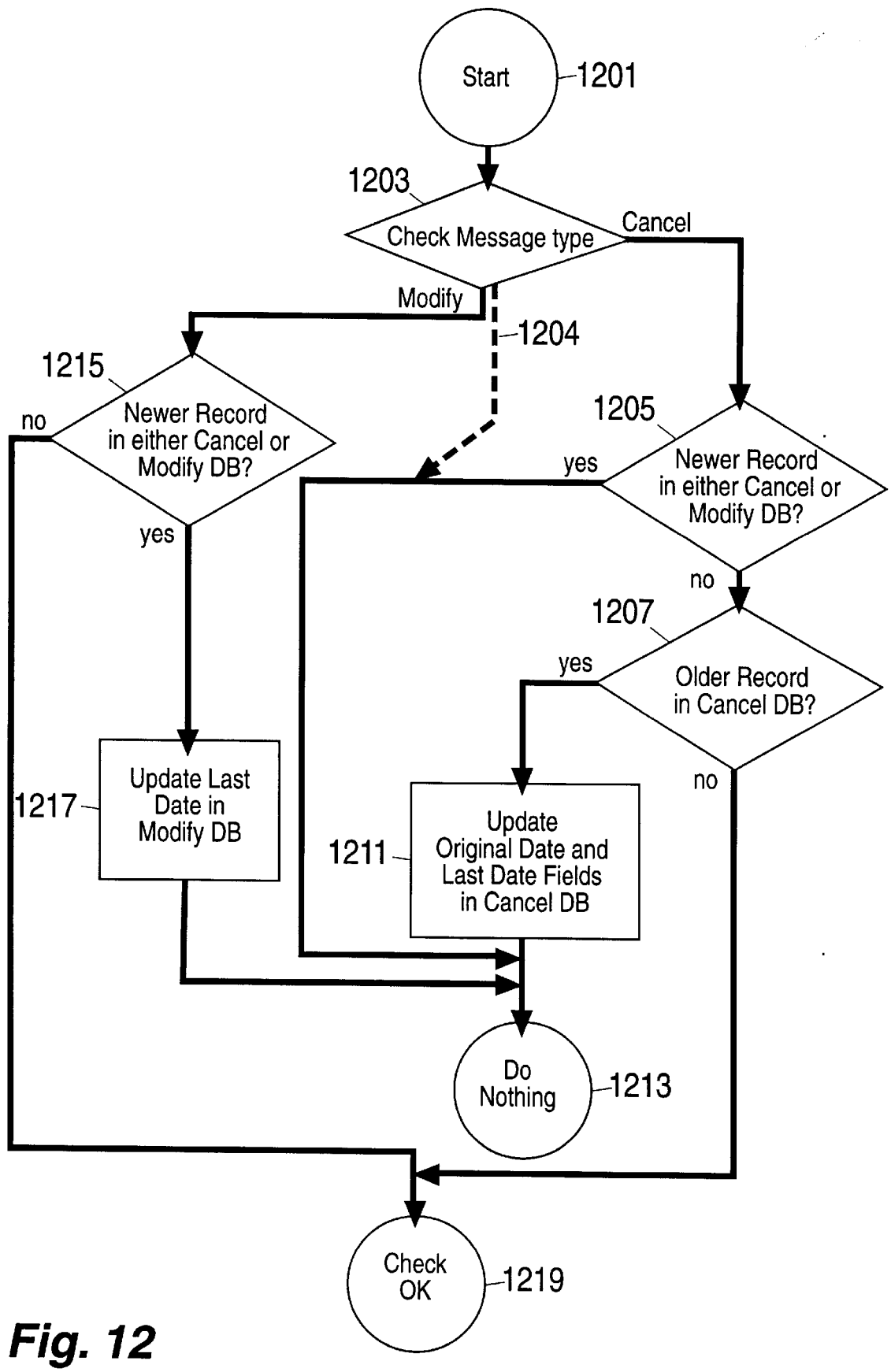
FIG. 12 illustrates the process used to check for, and process the receipt of multiple action messages in accordance with a preferred embodiment.

FIG. 12 illustrates the database checks invoked at the processing blocks labeled as 1004 and 1104 in FIG. 10 and FIG. 11 respectively. These checks help synchronize the multiple action. Messages that the sender may send. These multiple actions include sending multiple cancel messages, multiple modify messages or some combination of both. The check process starts at the terminal labeled as 1201. The first test is to determine whether the action message being processed is a cancel or modify message 1203. For embodiments incorporating the authentication check described below this test 1203 also determines the validity of the action request as applied to the targeted previously-sent message. If the encryption check fails the do nothing exit 1213 is taken as shown by the dashed arrow labeled as 1204. Thus no other operation is performed on the action message as indicated by the arrows labeled as 1005 and 1106 in FIGS. 10 and 11 respectively.

If the action message is a cancel message the next test 1205 is whether there is a newer record 820, 850 (based on the original date and time field 829, 859) in either the cancel or modify databases that is targeted toward the same previously-sent message. If such a record 820, 850 exists the do nothing exit 1213 is taken. Thus no other operation is performed on the action message as indicated by the arrows labeled as 1005 and 1106 in FIGS. 10 and 11 respectively. If such a record 820, 850 does not exist the next test 1207 checks whether an older record 820 exists in the cancel database. If no such record exists, the process completes through the terminal labeled as 1219 and processing of the cancel message continues normally. If an older record 820 exists in the cancel database, the original date and time field 829 is updated with the date and time information from the instant cancel message. Further the current date is saved into the last date field 827 of the record 820. Again, the process completes through the do nothing terminal 1213.

If the action message is a modify message, the process checks 1215 again for whether a newer record 820, 850 exists in either the cancel or modify databases that is targeted toward the same previously-sent message. If such a record 820, 850 does not exist the process completes normally through the terminal labeled 1219. If a newer action record does exist, the last date field 857 of the modify record 850 is updated 1217 and the process completes through the do nothing terminal labeled 1213.

Authentication

In one preferred embodiment of the invention the previously-sent message is protected from unauthorized cancellation or modification by using a public key encryption method (RSA is preferred) to assure that only the sender of the previously-sent message is able to alter the message. In this embodiment of the invention, an additional header field is added to the original message. That field is the X-Public-Key: field. The field-body contains the sender's public key. All action messages (the cancel and modify messages) include a X-Signed-ID: header. This field-body for this header contains the original message's unique message identifier that has been encrypted by the sender's private key. When the previously-sent message is received by the recipient's e-mail system, the public key information from the X-Public-Key: field is stored in the message database record 800 in the public key field 809.

When an action message is received by the recipient's e-mail system the encrypted message-ID (contained in the field-body of the X-Signed-ID: header) is decrypted using the value in the public key field 809 and compared with the value contained in the unique message number field 801. If the values are the same, the original sender of the previously-sent message also sent the action message. This decryption and check can be accomplished in many different areas of the receiving e-mail system. A preferred embodiment includes this check in the check message type test 1203 portion of the database check process as illustrated in FIG. 12 and described above.

Conclusion

One skilled in the art will understand that the invention as described above teaches a computerized e-mail system that provides additional functionality to the user of the e-mail system by allowing the author of a message to delete or modify previously-sent messages that have been sent beyond the scope of control off the sender's e-mail system.

Further, one skilled in the art will understand that various modifications and alterations may be made in the preferred embodiment disclosed herein without departing from the scope of the invention. Accordingly, the scope of the invention is not to be limited to the particular invention embodiments discussed above, but should be defined only by the claims set forth below and equivalents thereof.

What is claimed is:

1. A computer controlled method for altering a previously-sent electronic mail (e-mail) message; said previously-sent e-mail message sent by an originating e-mail system to a receiving e-mail system; said originating e-mail system having a scope of control where said receiving e-mail system is beyond said scope of control; said originating e-mail system maintaining information regarding said previously-sent e-mail message; said method comprising the steps of:

selecting said previously-sent e-mail message by using said information;

constructing an action message using said information;

sending said action message to said receiving e-mail system; and receiving said action message by said receiving e-mail system.

2. The computer controlled method of claim 1 further comprising a step of viewing said action message by a recipient.

3. The computer controlled method of claim 1 further comprising the steps of:

receiving said previously-sent e-mail message; and altering said previously-sent e-mail message as directed by said action message.

4. The computer controlled method of claim 3 wherein said action message is a cancel message and wherein said step of altering further comprises the step of deleting said previously-sent e-mail message.

5. The computer controlled method of claim 4 wherein said previously-sent e-mail message further comprises a public key and a unique message identifier; and wherein said cancel message further comprises an encrypted unique message identifier formed from a private key and said unique message identifier; and wherein said step of altering further comprises the step of authenticating said cancel message.

6. The computer controlled method of claim 3 wherein said step of altering further comprises the step of sending a confirmation message to said originating e-mail system.

7. The computer controlled method of claim 3 wherein said action message is a modify message and wherein said step for altering further comprises the step of modifying said previously-sent e-mail message.

8. The computer controlled method of claim 7 wherein said previously-sent e-mail message further comprises a public key and a unique message identifier; and wherein said modify message further comprises an encrypted unique message identifier formed from a private key and said unique message identifier; and wherein said step of altering further comprises the step of authenticating said modify message.

9. The computer controlled method of claim 1 further comprising the step of handling duplicates of said action message.

10. The computer controlled method of claim 1 further comprising the step of synchronizing actions of a plurality of action messages on said previously-sent e-mail message.

11. An electronic mail (e-mail) system having an originating e-mail system, a receiving e-mail system and a network; each of said originating system and said receiving system having a central processing unit (CPU), a memory coupled to said CPU, a network interface for connecting to said network, a display, and a filestorage; said originating e-mail system having a scope of control where said receiving e-mail system is beyond said scope of control; said originating e-mail system maintaining information regarding a previously-sent e-mail message; said e-mail system comprising:

a selection mechanism configured to select said previously-sent e-mail message by using said information;

a fabrication mechanism configured to construct an action message using said information;

a delivery mechanism configured to send said action message to said receiving e-mail system; and a first reception mechanism configured to receive said action message by said receiving e-mail system.

12. The e-mail system of claim 11 further comprising a message display mechanism configured to view said action message by a recipient.

13. The e-mail system of claim 11 further comprising:

a second reception mechanism configured to receive said previously-sent e-mail message; and an adjustment mechanism configured to alter said previously-sent e-mail message as directed by said action message.

14. The e-mail system of claim 13 wherein said action message is a cancel message and wherein said adjustment mechanism further comprises a deletion mechanism configured to delete said previously-sent e-mail message.

15. The e-mail system of claim 14 wherein said previously-sent e-mail message further comprises a public key and a unique message identifier; and wherein said cancel message further comprises an encrypted unique message identifier formed from a private key and said unique message identifier; and wherein said adjustment mechanism further comprises an authentication mechanism configured to authenticate said cancel message.

16. The e-mail system of claim 13 wherein said adjustment mechanism further comprises a confirmation mechanism configured to send a confirmation message to said originating e-mail system.

17. The e-mail system of claim 13 wherein said action message is a modify message and wherein said adjustment mechanism further comprises a modification mechanism configured to modify said previously-sent e-mail message.

18. The e-mail system of claim 17 wherein said previously-sent e-mail message further comprises a public key and a unique message identifier, and wherein said modify message further comprises an encrypted unique message identifier formed from a private key and said unique message identifier; and wherein said adjustment mechanism further comprises an authentication mechanism configured to authenticate said modify message.

19. The e-mail system of claim 11 further comprising a duplicate message mechanism configured to handle duplicates of said action message.

20. The e-mail system of claim 11 further comprising a message synchronization mechanism configured to synchronize actions of a plurality of action messages on said previously-sent e-mail message.

21. An apparatus for sending an action message; said apparatus having a central processing unit (CPU), a memory coupled to said CPU, a network interface for connecting to a network, a display, and a filestorage; said apparatus having a scope of control where a destination is beyond said scope of control; said apparatus maintaining information regarding a previously-sent e-mail message; said apparatus comprising:

a selection mechanism configured to select said previously-sent e-mail message by using said information;

a fabrication mechanism configured to construct an action message using said information; and a delivery mechanism configured to send said action message to said destination.

22. The apparatus of claim 21 wherein said action message is a cancel message.

23. The apparatus of claim 22 wherein said previously-sent e-mail message further comprises a public key and a unique message identifier; and wherein said cancel message further comprises an encrypted unique message identifier formed from a private key and said unique message identifier.

24. The apparatus of claim 21 wherein said action message is a modify message.

25. The apparatus of claim 24 wherein said previously-sent e-mail message further comprises a public key and a unique message identifier, and wherein said modify message further comprises an encrypted unique message identifier formed from a private key and said unique message identifier.

26. An apparatus for applying an action message to a previously-sent e-mail message; said apparatus having a central processing unit (CPU), a memory coupled to said CPU, a network interface for connecting to a network, a display, and a filestorage; said apparatus receiving said action message from an originating e-mail system having a scope of control where said apparatus is beyond said scope of control; said apparatus comprising:

a first reception mechanism configured to receive said action message;

a second reception mechanism configured to receive said previously-sent e-mail message; and an adjustment mechanism configured to alter said previously-sent e-mail message as directed by said action message.

27. The apparatus of claim 26 wherein said action message is a cancel message and wherein said adjustment mechanism further comprises a deletion mechanism configured to delete said previously-sent e-mail message.

28. The apparatus of claim 27 wherein said previously-sent e-mail message further comprises a public key and a unique message identifier; and wherein said cancel message further comprises an encrypted unique message identifier formed from a private key and said unique message identifier; and wherein said adjustment mechanism further comprises an authentication mechanism configured to authenticate said cancel message.

29. The apparatus of claim 27 wherein said adjustment mechanism further comprises a confirmation mechanism configured to send a confirmation message to said originating e-mail system.

30. The apparatus of claim 26 wherein said action message is a modify message and wherein said adjustment mechanism further comprises a modification mechanism configured to modify said previously-sent e-mail message.

31. The apparatus of claim 30 wherein said previously-sent e-mail message further comprises a public key and a unique message identifier, and wherein said modify message further comprises an encrypted unique message identifier formed from a private key and said unique message identifier; and wherein said adjustment mechanism further comprises an authentication mechanism configured to authenticate said modify message.

32. The apparatus of claim 26 further comprising a duplicate message mechanism configured to handle duplicates of said action message.

33. The apparatus of claim 26 further comprising a message synchronization mechanism configured to synchronize actions of a plurality of action messages.

34. An computer program product comprising:

a computer usable medium having computer readable code embodied therein for causing a computer to send an action message to alter a previously-sent e-mail message; said action message and said previously-sent e-mail message sent to a destination; said computer program product comprising:

computer readable code devices configured to cause said computer to effect a selection mechanism configured to select said previously-sent e-mail message;

computer readable code devices configured to cause said computer to effect a fabrication mechanism configured to construct said action message; and computer readable code devices configured to cause said computer to effect a delivery mechanism configured to send said action message to said destination.

35. The computer program product of claim 34 wherein said action message is a cancel message.

36. The computer program product of claim 35 wherein said previously-sent e-mail message further comprises a public key and a unique message identifier; and wherein said cancel message further comprises an encrypted unique message identifier formed from a private key and said unique message identifier.

37. The computer program product of claim 34 wherein said action message is a modify message.

38. The computer program product of claim 37 wherein said previously-sent e-mail message further comprises a public key and a unique message identifier; and wherein said modify message further comprises an encrypted unique message identifier formed from a private key and said unique message identifier.

39. An computer program product comprising:

a computer usable medium having computer readable code embodied therein for causing a computer to apply an action message to alter a previously-sent e-mail message; said computer program product comprising:

computer readable code devices configured to cause said computer to effect a first reception mechanism configured to receive said action message;

computer readable code devices configured to cause said computer to effect a second reception mechanism configured to receive said previously-sent e-mail message; and computer readable code devices configured to cause said computer to effect an adjustment mechanism configured to alter said previously-sent e-mail message as directed by said action message.

40. The computer program product of claim 39 wherein said action message is a cancel message and wherein said adjustment mechanism further comprises computer readable code devices configured to cause said computer to effect a deletion mechanism configured to delete said previously-sent e-mail message.

41. The computer program product of claim 40 wherein said previously-sent e-mail message further comprises a public key and a unique message identifier; and wherein said cancel message further comprises an encrypted unique message identifier formed from a private key and said unique message identifier; and wherein said adjustment mechanism further comprises computer readable code devices configured to cause said computer to effect an authentication mechanism configured to authenticate said cancel message.

42. The computer program product of claim 41 wherein said adjustment mechanism further comprises computer readable code devices configured to cause said computer to effect a confirmation mechanism configured to send a confirmation message.

43. The computer program product of claim 39 wherein said action message is a modify message and wherein said adjustment mechanism further comprises computer readable code devices configured to cause said computer to effect a modification mechanism configured to modify said previously-sent e-mail message.

44. The computer program product of claim 43 wherein said previously-sent e-mail message further comprises a public key and a unique message identifier, and wherein said modify message further comprises an encrypted unique message identifier formed from a private key and said unique message identifier; and wherein said adjustment mechanism further comprises computer readable code devices configured to cause said computer to effect an authentication mechanism configured to authenticate said modify message.

45. The computer program product of claim 39 further comprising computer readable code devices configured to cause said computer to effect a duplicate message mechanism configured to handle duplicates of said action message.

46. The computer program product of claim 39 further comprising computer readable code devices configured to cause said computer to effect a message synchronization mechanism configured to synchronize actions of a plurality of action messages.

47. A computer controlled method for altering a previously-sent electronic mail (e-mail) message; said previously-sent e-mail message sent by an originating e-mail system to a receiving e-mail system; said originating e-mail system having a scope of control where said receiving e-mail system is beyond said scope of control; said originating e-mail system maintaining information regarding said previously-sent e-mail message; said method comprising the steps of:

selecting said previously-sent e-mail message by using said information;

constructing an action message using said information; and sending said action message to said receiving e-mail system.

48. The computer controlled method of claim 47 further comprising the steps of:

receiving said action message; and viewing said action message by a recipient.

49. The computer controlled method of claim 47 further comprising the steps of:

receiving said action message;

receiving said previously-sent e-mail message; and altering said previously-sent e-mail message as directed by said action message.

\* \* \* \* \*